(12) United States Patent
Battlogg

(10) Patent No.: US 12,447,823 B2
(45) Date of Patent: Oct. 21, 2025

(54) HAPTIC OPERATING DEVICE COMPRISING A MAGNETORHEOLOGICAL BRAKING DEVICE AND A ROTATABLE OPERATING PART FOR VEHICLES

(71) Applicant: INVENTUS Engineering GmbH, St. Anton i.M. (AT)

(72) Inventor: Stefan Battlogg, St. Anton i.M. (AT)

(73) Assignee: INVENTUS Engineering GmbH, St. Anton i.M. (AT)

( * ) Notice: Subject to any disclaimer, the term of this patent is extended or adjusted under 35 U.S.C. 154(b) by 441 days.

(21) Appl. No.: 18/013,024

(22) PCT Filed: Jun. 26, 2021

(86) PCT No.: PCT/EP2021/067593
§ 371 (c)(1),
(2) Date: Dec. 27, 2022

(87) PCT Pub. No.: WO2021/260216
PCT Pub. Date: Dec. 30, 2021

(65) Prior Publication Data
US 2023/0241973 A1    Aug. 3, 2023

(30) Foreign Application Priority Data
Jun. 26, 2020    (DE) .................. 10 2020 116 935.3

(51) Int. Cl.
*B60K 35/25*    (2024.01)
*G05G 5/03*    (2008.04)
(Continued)

(52) U.S. Cl.
CPC ............. B60K 35/25 (2024.01); G05G 5/03 (2013.01); *F16D 57/002* (2013.01); *G05G 1/08* (2013.01)

(58) Field of Classification Search
CPC . B60K 35/25; G05G 5/03; G05G 1/08; F16D 57/002
See application file for complete search history.

(56) References Cited

U.S. PATENT DOCUMENTS 6,373,465 B2    4/2002  Jolly et al.
10,007,290 B2 *  6/2018  Battlogg ................ F16D 37/02
(Continued)

FOREIGN PATENT DOCUMENTS

DE           10029191 A1    12/2001
DE      202014002171 U1     7/2015
(Continued)

*Primary Examiner* — David R Morris
(74) *Attorney, Agent, or Firm* — Laurence A. Greenberg; Werner H. Stemer; Ralph E. Locher

(57) ABSTRACT

A haptic operating device for vehicles. The device has a rotatable operating part, a magnetic field source, and a magnetorheological braking device for braking a rotational movement of the operating part. The magnetorheological braking device has two braking components which can be rotated relative to one another and one of which is coupled to the rotatable operating part. The second brake component, acting as an outer brake component, surrounds the first brake component that acts as an inner brake component. A closed magnetorheological brake chamber is provided with a magnetorheological medium and is formed between the two brake components and has a peripheral braking gap.

20 Claims, 9 Drawing Sheets

(51) Int. Cl.
 *F16D 57/00* (2006.01)
 *G05G 1/08* (2006.01)

(56) References Cited

U.S. PATENT DOCUMENTS

| | | |
|---|---|---|
| 10,976,827 B2 | 4/2021 | Battlogg |
| 2002/0057152 A1 | 5/2002 | Elferich et al. |
| 2011/0128135 A1 | 6/2011 | Periquet et al. |
| 2013/0175132 A1 | 7/2013 | Battlogg |
| 2016/0378131 A1* | 12/2016 | Battlogg ............. F16H 59/0217 74/553 |
| 2020/0171949 A1 | 6/2020 | Battlogg |
| 2020/0355229 A1 | 11/2020 | Battlogg |

FOREIGN PATENT DOCUMENTS

| | | |
|---|---|---|
| DE | 102018100390 A1 | 7/2019 |
| EP | 1129399 A1 | 9/2001 |
| EP | 3422138 A1 | 1/2019 |
| WO | 2012034697 A1 | 3/2012 |
| WO | 2019138015 A1 | 7/2019 |

\* cited by examiner

HAPTIC OPERATING DEVICE COMPRISING A MAGNETORHEOLOGICAL BRAKING DEVICE AND A ROTATABLE OPERATING PART FOR VEHICLES

FIELD AND BACKGROUND OF THE INVENTION

The invention relates to a haptic operator control device having a rotatable operator control part, having at least one magnetic field source and having at least one magnetorheological brake device for braking a rotational movement of the operator control part for vehicles.

The haptic operator control device with the magnetorheological brake device for vehicles may be used in a wide variety of technical fields in motor vehicles (for example and not exclusively motor vehicles, aircraft and flying vehicles, ships, boats, in agricultural technology (tractors, combine harvesters, harvesting machines, other field-going machines for the agricultural industry, piste rollers . . . ) and construction machines). The haptic operator control device may be used for example for the operator control of technical devices in vehicles, for example as a rotary actuator; push/turn actuator; for the infotainment system, the air conditioning system (temperature, fan speed, distribution . . . ), as a transmission selector switch, for the navigation system, for the cruise control system, for the clearance control system, for the seat adjustment, in the steering system or in the steering wheel, for the operator control of the chassis adjustment, for drive mode adjustment, for windshield wiper setting, as a window or sliding roof adjuster, as a parking assistant or for setting the (partially) autonomous driving system, or as a steering wheel substitute, etc.

The haptic operator control device has a magnetorheological brake device which is provided in particular with a magnetorheological medium and preferably with a magnetorheological fluid. Magnetorheological fluids have, for example, ultrafine ferromagnetic particles, for example carbonyl iron powder, distributed in an oil. In magnetorheological liquids, use is made of spherical particles which have a diameter of 1 to 10 μm owing to a production process, wherein the particle size and shape are not uniform. If a magnetic field is applied to such a magnetorheological fluid, the carbonyl iron particles of the magnetorheological fluid interlink along the magnetic field lines, such that the rheological characteristics of the magnetorheological fluid (MRF) are influenced considerably (transmissible shear stresses) in a manner dependent on the form and strength of the magnetic field. This also applies to magnetorheological media in which the carbonyl iron particles of the magnetorheological medium interlink along the magnetic field lines, such that the transmissible shear stresses are influenced considerably in a manner dependent on the form and strength of the magnetic field.

WO 2012/034697 A1 has disclosed a magnetorheological transmission device which has two couplable components, the intensity of coupling of which can be influenced. To influence the intensity of coupling, a channel with a magnetorheological medium is provided. The magnetorheological medium in the channel is influenced by way of a magnetic field. Rotary elements are provided in the channel, on which rotary elements there are provided acute-angled regions which contain the magnetorheological medium. The magnetic field of a magnetic field generating device can be applied to the channel or to at least a part thereof in order to selectively (magnetically) interlink the particles, and wedge these together with the rotary element, or release said particles. This magnetorheological transmission device may also be used on a rotary dial for the operator control of items of technical equipment. Such a magnetorheological transmission device functions and allows the transmission of relatively high forces or torques whilst at the same time having a relatively small structural form or structural volume and energy requirement.

WO 2012/034697 A1 has also disclosed a rotary dial or operator control dial in the case of which the dial itself is attached so as to be rotatable about a shaft. The braking moment can be controlled by way of the magnetic field generated by an electrical coil. If it is sought to be able to generate a higher braking moment, it is also possible for cylindrical rollers to be used instead of spherical rotary elements, such that the magnetic field acts over a longer distance or greater area (magnetic field concentration and wedge formation occur over a greater area). In particular in the case of rotary or operator control dials of relatively small diameter, it has been found that a lengthening of the rolling elements does not necessarily lead to an increase in the maximum braking moment that can be generated. It has been found that this is because the magnetic field is closed by, or must pass through, the central shaft. The small diameter of the shaft limits the braking moment that can be generated, because the magnetic field required for the braking operation is quickly saturated in the (shaft) material. The material through which the magnetic field flows does not allow any greater a magnetic flux, as a result of which it is also not possible for any stronger a magnetic field to reach the rollers. The smallest cross section through which the magnetic field flows in the entire magnetic circuit defines the maximum possible magnetic flux and thus the maximum braking moment in the brake device. The use of longer rollers as rotary elements may even have an adverse effect on the braking moment that can be generated, because the magnetic field is distributed over the longer roller surface. A lower field strength prevails (per unit of transmission area) (low magnetic field concentration). Because the achievable braking action is not linearly dependent on the magnetic field but increases disproportionately with stronger magnetic fields, the achievable braking action correspondingly decreases disproportionately with weaker magnetic fields.

In the case of haptic operator control devices for vehicles, the structural space requirement and the price (production costs) play a major role. In the context of mass production, the selection of the materials and production methods is of major importance. The saving of costs is an important topic. At the same time, stringent requirements are placed on precision. Rotatable haptic operator control elements that can be braked in targeted fashion using a magnetorheological brake device should on the one hand have a very low base moment, in order to provide easy and non-strenuous operator control, and on the other hand, it should be possible to impart a relatively high braking moment in order to be able to provide clearly perceptible haptic feedback.

SUMMARY OF THE INVENTION

It is therefore the object of the present invention to provide a haptic operator control device having a rotatable operator control part and having a magnetorheological brake device for vehicles, which haptic operator control device is of simple and inexpensive design and in particular makes it possible to realize a high braking moment with small or even very small diameters and in particular very small structural volumes.

Said object is achieved by means of a haptic operator control device for vehicles having the features of the claims. The subclaims relate to preferred refinements of the invention. Further advantages and features of the haptic operator control device for vehicles will emerge from the general description and from the description of the exemplary embodiments.

A haptic operator control device for vehicles and in particular motor vehicles comprises at least one rotatable operator control part, at least one magnetic field source and at least one magnetorheological brake device for braking a rotational movement of the operator control part. The magnetorheological brake device comprises at least two brake components which are rotatable or at least pivotable relative to one another and of which one is coupled to the rotatable operator control part. The second brake component, as outer brake component, surrounds the first brake component, as inner brake component, at least in certain portions. Between the two brake components, there is formed a magnetorheological brake chamber which is in particular closed (at least in certain portions) and provided with a magnetorheological medium and which has at least one (encircling) gap or brake gap. In particular, the magnetorheological medium comprises a liquid and/or gaseous carrier medium in which magnetically manipulable particles are included. The particles may also be included in the brake chamber without carrier medium.

The brake chamber is particularly preferably sealed off (to the outside) by means of at least one seal. The seal (which is in particular wetted by, and thus in contact with, the magnetorheological medium) comprises a seal base, which is connected to the inner brake component, and at least one seal lip, which bears against the outer brake component. The seal preferably comprises a seal base that is connected only to the inner brake component, and/or at least one seal lip that bears only against the outer brake component.

Such a haptic operator control device for vehicles and in particular motor vehicles, having a rotatable operator control part and having at least one magnetorheological brake device, has numerous advantages. A major advantage of the haptic operator control device consists in that the seal lip bears at the outside against the outer brake component, and not at the inside against the inner brake component. This offers major advantages also in terms of the material selection for the inner brake component or for parts of the inner brake component. It is not necessary for the inner brake component to be manufactured from metal or some other hard material in the region of the seal base, or for a separate sleeve composed of such material to be attached. In the region in which it receives the seal base, the inner brake component may also be produced from a soft material and for example a plastic. This offers numerous possibilities for improvement in terms of design and manufacturing.

Some other suitable design of the seal is however also possible and advantageous. In particular, the carrier medium in which the magnetically manipulable particles are included is also taken into consideration in the design of the seal. Provision may be made for the seal to have at least one seal base, which is connected to the outer brake component, and/or at least one seal lip, which bears against the inner brake component. Combinations of the above-described arrangements of seal base and seal lip are also possible.

The magnetorheological brake device may be received on a holder or support element. The support element may be formed on a console. For example, the support element may be fastened to the central console or to some other vehicle component of a motor vehicle.

The first or inner brake component extends in particular in an axial direction and may be connected rotationally fixedly to the support element. Formed between the first and the second brake component is an encircling gap, which may also be referred to as brake gap or effective gap. The gap is at least partially filled with a magnetorheological medium.

Here, the magnetorheological medium in particular wets the first and the second brake component at least in certain portions. Wetting is to be understood to mean any form of contact. For example, it is also possible for air or a vacuum to be provided as a medium for the magnetically manipulable particles. The first and the second brake component are then in contact with or wetted by air, or only by the particles, at least in certain portions. In particular, the seal is then also in contact with air or the particles. The seal is in particular suitable and configured to impart a sealing action with respect also to particles that are situated in air and/or in a vacuum. The first brake component comprises a core which extends in the axial direction and which is composed of a magnetically conductive material, and an (at least one) electrical coil. The electrical coil may be wound radially or axially around the core.

Preferably, the electrical coil is wound in an axial direction around the core and spans a coil plane, such that a magnetic field of the electrical coil extends transversely (with respect to the axial direction) through the first brake component.

It is possible and preferred here for a maximum (outer) diameter of the electrical coil in a radial direction within the coil plane to be greater than a minimum (outer) diameter of the core in a radial direction transverse (and in particular approximately perpendicular, or perpendicular) with respect to the coil plane.

In any case, the first brake component defines an axial direction. The first brake component may however also be at least locally configured to be angled with respect to the axial direction. The statement that the core of the first brake component extends in the axial direction is to be understood in the context of the present invention to mean that the core at least also extends substantially in the axial direction. The core may have a profile that is oriented preferably parallel to the axial direction, though may also have a slight angle with respect to the axial direction. For example, the core may also be oriented at an angle of 2.5° or 5° or 10° or 15° with respect to the axial direction. Likewise, the winding of the electrical coil need not be oriented exactly in an axial direction around the core (or radially around said core). The electrical coil may also be wound around the core at an angle of 5° or 10° or 15° or similar with respect to the axial direction. In all cases, it is however preferred for an angle between the orientation of the core and the axial direction, and an angle of the winding of the electrical coil with respect to the axial direction, to be less than 20° and in particular less than 10°.

It is particularly preferably possible for a magnetic field of the magnetic field source to be applied to the gap. Here, the magnetic field passes through the gap. The magnetic field is (in certain portions) conducted through a magnetically conductive outer brake element of the outer brake component. The outer brake component may be in particular substantially composed of or formed from the magnetically conductive outer brake element. The outer brake component is particularly preferably configured to be more resistant to abrasion in a contact region with respect to the seal lip than the inner brake component is in a contact portion with respect to the seal base.

It is particularly preferable for the seal lip to be of elastic form and to sealingly bear elastically with a (in particular low) spring force against the outer brake component and preferably against the magnetically conductive outer brake element.

The seal preferably has a seal base, which is connected to the first brake component, and at least one and in particular exactly one encircling (elastic) seal lip, which bears against the second brake component, and the second brake component is harder in the contact region with respect to the (elastic) seal lip than the inner brake component is in the contact portion with respect to the seal base.

The outer brake component is preferably more resistant, in the contact region, to wear caused by the seal lip than the inner brake component is in a contact portion with respect to the seal base. A rotational movement of the seal lip relative to the inner brake component, and wear possibly resulting therefrom, are prevented. It is thus possible for the inner brake component—with the exception of the core—to be formed from relatively lightweight and relatively low-strength materials, for example from a plastic or from a soft metal (in particular also from a magnetically soft metal).

In all refinements, the seal base may for example be adhesively bonded to the inner brake component, or else held on the inner brake component by way of elastic forces. The seal base may for example also adhere by way of a central inner fastening ring to the inner brake component. For this purpose, on the inner circumference of the seal base, there may be provided an encircling groove into which, for example, the fastening ring (for example an O-ring or a quad ring or the like) is inserted. The radially inwardly protruding fastening ring then adheres on the outer surface of the inner brake component, which may also have an encircling groove on its outer surface, in order to position the fastening ring, the seal base and thus the seal in a defined manner. The seal may however also be clamped for example by means of a screw or a nut that is screwed on.

The outer brake component is preferably rotatable. Here, the outer brake component is preferably not only arranged so as to be pivotable through a determined (and limited) angle but can be freely rotated without being influenced by the magnetorheological brake device. The operator control part is preferably coupled, and in particular connected substantially or entirely rotationally conjointly, to the outer brake component.

It is also possible for the inner brake component to be rotatable, and for the operator control part to be coupled to the inner brake component.

The inner brake component preferably has a shank composed of a plastic. The seal base is preferably applied or fixed to and/or on the shank.

The seal particularly preferably has a U-shaped, V-shaped, C-shaped or W-shaped or disk-shaped cross section. The U-shaped, V-shaped, C-shaped or W-shaped cross section is particularly preferably open toward the brake gap. In this way, in the event of a pressure increase in the interior, caused for example by temperature, the sealing action is further intensified.

The inner brake component extends in particular in an axial direction, or defines an axial direction. The inner brake component is preferably configured as a stator unit, and the outer brake component is preferably configured as a rotor unit. The rotor unit is preferably rotatable relative to the stator unit.

It is particularly preferable if the inner brake component has a stator element, with a core composed of a magnetically conductive material, and has an electrical coil, which is wound around the core, as a magnetic field source.

It is preferable if a maximum outer diameter of the electrical coil in a radial direction within the plane spanned by the electrical coil (coil plane) is greater than a minimum outer diameter of the core in a radial direction transverse with respect to the coil plane.

A particular advantage is achieved if the electrical coil is wound in an axial direction around at least a major part of the core, or around the entirety of the core. If a maximum outer diameter of the electrical coil in a radial direction within the coil plane is greater than a minimum outer diameter of the core in a radial direction transverse, and in particular at least approximately perpendicular, with respect to the coil plane, it is possible to realize a relatively large core diameter. A relatively large core cross section makes it possible for a more intense magnetic field to be generated (higher field strengths in the brake gap or effective gap). In this way, it is possible to generate higher braking forces in the same structural space, or else the same braking forces in a smaller structural space, that is to say the achievable torque per unit of structural volume increases. If required, it is also possible for considerable braking forces to still be generated in a very small structural space.

This arises from the fact that the magnetic field of the electrical coil runs transversely with respect to the axial direction of the first brake component (that is to say radially in relation to the longitudinal axis), and from the fact that the diameter of the electrical coil is enlarged.

This is a considerable difference in relation to the prior art known from WO 2012/034697 A1, where the electrical coil is provided on the outer component, and where the windings of the electrical coil extend concentrically around the axial direction. Thus, in said prior art, a magnetic field is generated which extends in an axial direction through the interior of the two components. The inner component, normally a thin shaft necessitated by the design, thus limits the magnetic flux cross section, and thus the maximum achievable total magnetic flux, in said prior art. By contrast thereto, in this refinement, the magnetic field runs, or the magnetic field lines run, transversely with respect thereto, and thus transversely through the first or inner brake component. Here, a lengthening of the first brake component whilst maintaining the same diameter increases the possible magnetic flux and thus the braking moment. The core diameter, which normally cannot be made larger for design reasons (owing to the structural space), thus no longer restricts the magnetic flux. In the case of the present invention, the winding(s) of the electrical coil preferably lie(s) (at least substantially) in a plane or closely adjacent to the plane that encompasses the central axis of the axial direction. By contrast, in WO 2012/034697 A1, the central axis lies perpendicular to the plane of the windings of the electrical coil.

Such an embodiment is also highly advantageous in relation to the prior art from WO 2019/138015 A1, which presents a magnetorheological brake device with an electrical coil wound around a longitudinal axis. By contrast thereto, the magnetic field in the core can be enlarged, and it is thus also possible for the braking force to be increased and/or the structural space to be reduced. In said prior art, rolling elements are arranged, and can revolve, over the entire circumference. It is surprising that an intensification of the braking force can be achieved with a design in which a full revolution of the rolling elements is no longer possible because the electrical coil protrudes outward.

This is achieved by virtue of the available structural space being utilized expediently and in particular in the best possible manner. It is an aim to generate the greatest possible magnetic field strength (a high number of amps/meter) in the effective gap between the effective surfaces that move relative to one another (rotating relative to static components). To make this possible, particular magnetic cross sections are required in the components through which the magnetic field flows (magnetic circuit), which in turn must be fed from an electrical coil with a suitable winding window and electrical configuration (wire thickness/wire diameter, number of windings/turns). All of this must be implemented within a normally predefined (and often constricted) structural space.

Tests carried out in the prior art have shown that a brake unit that is fully populated with rollers results in a lower braking moment than one which is partially populated because, in the case of a fully populated brake unit, the magnetic field generated by the electrical coil and generated by means of the geometrically restricted core is distributed across multiple transmission elements, resulting in a lower field strength per transmission unit. A lower field strength leads disproportionately to a lower braking moment. In this refinement of the design, the MRF brake has not been implemented with magnetically non-conductive rollers (these are, as it were, placeholders), but the space for these components that do not generate torque has been utilized to enlarge the electrical coil and the core, such that a greater magnetic field is generated. This results in an increase in the braking moment in the same structural space, because the field strength in the effective gap is thus increased. The structural space has been utilized in the best possible manner.

In the magnetorheological brake device, the transmission components are at least partially surrounded by a magnetorheological medium. Overall, a magnetorheological fluid is preferably used as magnetorheological medium.

It is preferable for multiple, in particular rotatable, transmission components to be arranged so as to be distributed over the circumference of the gap. The transmission components may be rotatable in the gap, and then preferably at least partially rotate during a rotation of the first and second brake components relative to one another. A central constituent part of the rotatable transmission component, or the rotatable transmission component as a whole, is in particular dimensionally stable and (at least substantially) does not change its external shape during a rotation. The rotatable transmission component preferably rotates at least to a certain extent during a rotation of the second brake component relative to the first brake component.

In a preferred refinement, at least one transmission component is configured as a rolling element. The expression "rolling element" is to be understood in the context of the present invention to mean a rotary element that is suitable for rolling in the gap on the first and/or second brake component.

It is preferable for at least one rolling element to have a cylindrical or spherical or round or rounded (substantially dimensionally stable) cross section. In particular, a rolling element may have a (an elongate) cylindrical portion. At the ends, the rolling element may be rounded or may taper to a point or may be of angular design. Other portions, and in particular end portions, are also possible. It is particularly preferable for cylindrical rollers to be used as rolling elements. A cylindrical rolling element has the considerable advantage that the rolling element can act over the length of the cylindrical portion. This increases effectiveness.

A considerable advantage of the present invention consists in that a greater braking moment can be generated as a result of an elongation of a, for example cylindrical, rolling element. Along with the lengthening of the rolling element, it is (expediently) possible for the electrical coil, which extends in a longitudinal direction of the first brake component, to also be lengthened. With an electrical coil that is longer in an axial direction, a greater passage area (cross-sectional area through which the magnetic field flows) is provided for the magnetic field. Therefore, in the case of this refinement, a lengthening of the first brake component in an axial direction also results in an enlargement of the cross section of the core. In this way, a greater braking moment can be achieved by way of a lengthening of the first brake component in an axial direction.

In preferred refinements, at least a proportion of the transmission components is composed of a magnetically conductive material. It is possible for a proportion of the transmission components to be composed of a magnetically non-conductive material. It is preferable for the majority of the transmission components to be composed of a magnetically conductive material. In all cases, the magnetic field is concentrated in the region of the magnetically conductive transmission components. This leads to the concentration of the magnetic field and to a local strengthening (magnetic field line concentration). Since the relationship between the braking moment that can be generated and the strength of the magnetic field is non-linear, and since the braking moment that can be generated becomes disproportionately greater with strengthening of the magnetic field, it is thus possible (with the same structural space/dimensions) to achieve a considerable increase of the braking moment that can be generated.

The iron particles are pulled in the direction of the magnetic field gradient (the force on magnetizable particles always acts in the direction of the stronger magnetic field). In this way, in the regions of greater magnetic field line concentration, the concentration of carbonyl iron particles is also increased. For example, the magnetic field strength in the gap is thus increased from <350 A/m to values greater than 350 A/m, and to values of up to 1000 A/m (1 kA/m) or higher. The high (concentrated) field strength attracts more carbonyl iron particles out of the magnetorheological liquid, and carbonyl iron accumulation (clustering) occurs. This in turn makes it possible for higher shear stresses and thus braking moments to be generated.

In all embodiments, to increase the braking moment that can be generated, it is not necessary to increase the diameter of the first brake component. This is very important because many possible applications do not allow a greater outer diameter of a brake device, or a greater outer diameter would be a severe competitive disadvantage (for example, an oversized adjustment wheel on the side of a wristwatch). To strengthen/increase the braking moment, the first brake component can be made axially longer, which, depending on the circumstances, is not a disadvantage, or is a relatively minor disadvantage, in terms of structural space.

The outer brake component has, in particular, a magnetically conductive outer brake element. The outer brake component, and in particular the outer brake element of the outer brake component, preferably has a cylindrical inner surface at least in certain portions (in an axial direction).

It is preferable if, on at least one angle segment of the outer circumference of the core, at least one transmission component is arranged between the core and the cylindrical inner surface of the magnetically conductive outer brake element. In particular, on the angle segment, the core and/or the stator unit has molded elements formed laterally adjacent to the core, which molded elements form at least one receptacle adapted to the shape of the transmission components. In the case of cylindrical roller-like transmission components, the core is preferably of correspondingly concave form in the region of the receptacle. There is preferably only a small gap between the receptacle and the transmission component. In this way, the transmission component is enclosed by the receptacle, and the magnetic field is transmitted particularly effectively to the transmission component.

In other embodiments, or outside the regions of the receptacles, the outer surface of the core is preferably of cylindrical form (at least or only) over the angle segment.

In particular, the electrical coil is received on the core outside the angle segment. The electrical coil particularly preferably projects radially further to the outside than the outer surface of the core in the angle segment.

In all embodiments, it is preferable for at least two angle segments to be formed, on which transmission components are arranged, wherein, in particular, at least one angle segment and preferably each angle segment is less than 150°.

In advantageous embodiments, transmission components are arranged only in the angle segment or in the (in particular two) angle segments.

In advantageous refinements, a radial gap dimension formed between the radially outer ends of the transmission components and the cylindrical inner surface of the magnetically conductive outer brake element is smaller than a radial spacing between the coil and the cylindrical inner surface of the (magnetically conductive) outer brake element. At the radially outer ends of the transmission components, there is preferably a gap with a small gap height (effective gap). In this way, in combination with high field strengths, an advantageous wedge effect is possible.

It is possible for the core to be fixedly connected to multiple transmission components. It is then possible that no transmission component is rotatable. It is however also possible for some transmission components to be fixedly connected to the core, and for other transmission components to be provided as separate parts, which can optionally also move or rotate relative to the core. Said parts may be provided with lateral rotatable guidance.

The transmission components fixedly connected to the core may be formed integrally with the core or fixedly connected, and for example screwed or riveted or welded or connected rotationally conjointly in some other way, to said core.

It is preferable for at least some transmission components (which are fixedly connected to the core) to form outwardly protruding arms of the core.

It has surprisingly been found that particularly strong interlinking of the magnetorheological particles in the magnetorheological medium can be generated even without (rotating) rolling elements. With a strong magnetic field and high field strengths in the effective gap, effective interlinking and accumulation of carbonyl iron particles can be achieved. In all cases, the transmission components serve as magnetic field concentrators. Transmission components may also be referred to as magnetic field concentrators. Owing to the high field concentration in the region of the transmission components, a particularly high field strength and thus particularly strong interlinking and accumulation of particles are realized. The wedging effect strengthens the effect because, over the circumference, the gap does not have a constant height but narrows. In the region of the transmission components, the radial gap height is reduced, whilst adjacent regions can interlink and form a type of cluster/accumulation.

In all embodiments, it is preferable for the first brake component to be received in axially displaceable fashion on the second brake component and/or the support element.

It is preferable if at least one sensor device is included, wherein the sensor device comprises at least one magnet ring unit (which is in particular indirectly or directly fastened to, and particularly preferably coupled rotationally conjointly to, the outer brake component) and at least one magnetic field sensor, which is attached rotationally fixedly to the first brake component and which is arranged radially and/or axially adjacent to the magnet ring unit and which serves for detecting a magnetic field of the magnet ring unit. In particular, at least one Hall sensor is used. A two-dimensional or three-dimensional Hall sensor is advantageous. The magnet ring unit preferably has a south pole at one radial end and a north pole at the opposite radial end. By detecting the orientation of the magnetic field lines within (radially within) the magnet ring unit, it is thus possible for the angular position of the two brake components relative to one another to be determined.

In particular, the magnet ring unit is fastened (indirectly) to the outer brake element.

In all refinements, it is preferable if at least one shield device for at least partially shielding the sensor device from a magnetic field of the electrical coil and/or from other components and/or from some other external magnetic field is included.

In particular, the shield device comprises at least one shield element, which surrounds the magnet ring unit at least in certain portions. Preferably, the shield device has at least one separating unit, which is arranged between the shield element and the magnet ring unit, and/or at least one magnetic decoupling device, which is arranged between the shield element and the outer brake component (the outer brake element or a magnetically non-conductive element connected thereto).

The separating unit and the decoupling device have, in particular, magnetic conductivity several times lower than that of the shield element. Particularly advantageous shielding of any interfering magnetic fields is thus achieved. Here, the shield element, which may be of multi-part form, is composed of such a magnetically conductive material, and has a wall thickness which is such that no magnetic saturation occurs in at least one wall, or in the walls, of the shield element during normal operation. In this way, effective shielding is ensured, and a high quality of the measurement signal can be achieved.

The shield device may be of multi-part form and comprise multiple components that are connected to one another. In particular, the shield device comprises at least one annular sleeve and at least one axial annular disk, or for example two axial annular disks, wherein one axial annular disk may then be arranged at each end.

In particular, the sensor device is arranged radially centrally, and approximately axially centrally, on the shield device (which spans a cylinder portion volume). An axially slightly eccentric position may be advantageous if an axial position is derived from a strength of the measured magnetic field.

In particularly advantageous embodiments, the shield device and the magnet ring unit are arranged spaced apart from one another in a radial and an axial direction. For example, a separating unit composed of a magnetically non-conductive or only poorly conductive material may be provided between the shield element and the magnet ring unit. The separating unit may for example be composed of a plastic. For example, the separating unit may be composed of an injection-molded part. The separating unit preferably ensures a defined spacing and defined positioning.

It is preferable for a closed (and outwardly sealed) chamber to be formed between the two brake components. It is possible and preferable for the second brake component to be rotatably received or mounted on the first brake component (approximately) at a first end of the closed chamber (at a first bearing point). The closed chamber is particularly preferably substantially and in particular completely filled with the magnetorheological medium.

The second or outer brake component is preferably received and for example mounted in axially displaceable fashion on the first or inner brake component, such that a volume of the closed brake chamber varies as a result of a relative axial displacement of the two brake components with respect to one another in order to provide compensation for temperature-induced changes in volume.

It is possible that, at a second end of the brake chamber, the second brake component is received on the first brake component in displaceable fashion (and may be separately mounted there), wherein a diameter of the first bearing point at the first end of the closed brake chamber differs from a diameter of the second bearing point at the second end of the closed brake chamber.

In all embodiments, it is preferable that the operator control part is formed or received on the outer brake component and is configured for example as a rotary part, rotary dial, mouse wheel or rotary wheel. The rotary part may preferably be formed, for example, integrally with a rotary dial or rotary wheel. In such embodiments, it is preferable for the rotary dial or the rotary part to be of "pot"-shaped form. The "lid" of the rotary part may be connected integrally to a rotary part configured as a sleeve part, or may be fastened separately thereto.

The operator control part preferably comprises the outer brake element composed of a magnetically conductive material. The outer brake element provides an outer ring for the magnetic field. The magnetic field for generating a braking moment passes transversely with respect to the axial direction through the first brake component, and passes through the gap at the transmission elements, which are magnetically conductive. Proceeding from the static or movable transmission elements or the rotatable rolling elements, the magnetic field enters the outer ring or the outer brake element. There, the magnetic field lines run back to the other side of the first or inner brake component, and pass again (on the opposite side) through the gap to the transmission elements or rolling elements, before the magnetic field lines enter the inner brake component again. This results in a closed magnetic circuit, or closed magnetic field lines.

Under the influence of a magnetic field, a wedge effect arises at the rolling elements during a relative rotation of the first and the second brake component with respect to one another, as has been described in principle in WO 2012/034697 A1. The disclosure of said document is incorporated in its entirety into this application. In the case of the present invention, the braking moment is generally likewise generated by way of the wedge effect at the static or movable transmission components or rolling elements or rotary elements. It has surprisingly been found that rolling elements are not always necessary. This is highly advantageous in particular in the case of particularly small equipment components. A corresponding design is possible even in the case of a braking action implemented by way of shear forces without the use of transmission components.

Preferably, at least a radial wall thickness of the outer brake element is at least half as great as a gap width of the gap and/or a diameter of a transmission component. Preferably, a radial wall thickness of the outer brake element is greater than ¾ of the gap width of the gap and/or of a diameter of a transmission component. The radial wall thickness of the outer brake element may in particular also be greater than a diameter of a transmission component. By way of a sufficient wall thickness of the outer brake element composed of a magnetically conductive material, it can be ensured that the desired field strength of the magnetic field can be generated in the region of the rolling elements in order to be able to generate a high braking moment.

In all embodiments, it is preferable for a length of the first or inner brake component in the axial direction to be greater than a length of a transmission component in the axial direction. If the transmission component is shorter in the axial direction than the first brake component, this leads to a three-dimensional concentration of the magnetic field in the edge region of the transmission component or of the rolling element. The magnetic field can pass through the gap practically only in those portions in which a transmission component or a rolling element is situated.

A length of the gap in the axial direction is preferably at least twice as great as a length of a transmission component in an axial direction. It is also possible and preferable for two or more transmission components and in particular rolling elements to be arranged one behind the other in an axial direction. Here, it is for example possible for magnetically conductive transmission components and magnetically non-conductive transmission components to alternate in an axial direction, such that, for example, every second or third transmission component in an axial direction is magnetically non-conductive. This generates a concentration of the magnetic field (high field strengths in the effective gap at the magnetically conductive transmission components), which is advantageous for the maximum braking moment that can be generated.

In certain embodiments, the first brake component is substantially cylindrical and comprises a cylindrical main element as a core and comprises the electrical coil or the electrical coils. Shapes that deviate from this may however also be selected (ellipse . . . ).

It is also possible, for example, for a ball to be included for the mounting of a rotary dial or of the brake device of the equipment component, which ball may be arranged centrally at the distal end in order to provide a simple mounting arrangement between the first brake component and the second brake component.

It is possible for the electrical coil to be at least partially wound in axial grooves and/or transverse grooves of the cylindrical stator element of the stator unit (of the first brake component). The windings of the electrical coil, or the component as a whole, are/is preferably encapsulated with potting compound. It is preferable for any axial grooves and/or transverse grooves that are present to be at least partially filled with potting compound. This prevents magnetorheological medium or magnetorheological fluid from entering the region of the coil wires. This could, in the case of a magnetorheological fluid, lead to demixing of the fluid.

The support element and/or the stator unit and preferably the stator shank preferably has a cable leadthrough. Connection cables for the coil and/or sensor cables and the like can be led through the cable leadthrough. This allows easy installation and inexpensive production.

The support element preferably has a receptacle for rotationally fixed connection to the first brake component. Here, the support element may receive the first brake component in non-positively locking and/or positively locking fashion. During operation, the braking moment between the first brake component and the second brake component is dissipated via the support element.

The stator unit preferably has a cylindrical receptacle for a bearing unit, and the second brake component is preferably supported rotatably on the stator unit.

The seal for sealing off the gap is preferably arranged on the cylindrical running surface, wherein the seal is in particular arranged closer than the bearing unit to the gap. In this way, the bearing unit is reliably protected from the magnetorheological medium. Such an embodiment allows a compact design and reliable operation. The bearing unit may for example be a plain bearing or rolling bearing.

The haptic operator control device may be fastened to a console or to other parts.

It is preferably possible for a relative angular position or an absolute angular position to be detected. An accuracy is preferably better than 1° and in particular better than 0.5°, and particularly preferably better than 0.2° or 0.1°.

A user interface, an operator control panel, a display, a touch-sensitive display with or without haptic feedback, and/or at least one sensor, is preferably installed. Such an embodiment not only allows operator control but also at the same time allows information to be displayed or output during operator control operations. This makes it possible, for example, to realize an operator control dial which at the same time has an output display.

In all embodiments, it is possible for a pressure-sensitive sensor to be attached to the support element or the stator unit, or for such a sensor to be assigned to the stator unit. For example, a pressure-sensitive sensor may be installed in the stator unit. It is however also possible for a piezo sensor to be installed on the lower part of the stator unit or on the console etc. It is also possible for an axial displacement of the two brake components relative to one another to be registered. Haptic feedback may be implemented here.

In all embodiments, it is preferable for a difference between a clear inner diameter of the outer brake element and a minimum outer diameter of the first brake component to be greater than 1 or 2 or 3 mm and less than 50 mm. It is likewise preferable for an outer diameter of the outer brake element to be between 5 mm or 10 mm and 90 mm. A height of the operator control part is preferably between 5 mm and 100 mm. In all embodiments, it is preferable for a control device to be included which is configured to use the electrical coil to generate a variable and targetedly controllable braking action.

Altogether, the present invention particularly preferably operates in accordance with the basic principle of wedge clamping, wherein a transmission component slides along the walls with a certain spacing, or optionally rolls on said walls. A magnetic field gives rise to the wedge effect, such that a high braking moment can be generated. A magnetic field is preferably generated transversely with respect to (the core of) the first brake component. Here, owing to the radially enlarged electrical coil, higher braking moments can be generated with a smaller structural size. The use of this axial coil allows better scalability. It is thus made possible to use relatively long rolling elements and an axially relatively long electrical coil to generate a scalable and relatively high braking moment, or to use a short design to generate a correspondingly lower braking moment. Here, it is not necessary for the diameter of the first brake component to be made larger in order to conduct a corresponding magnetic field, because, with an axial adaptation of the core, the area of the core (cross-sectional area) is also enlarged. The axial length may optionally also be reduced if only a relatively low braking moment is required. The structural space can be adapted accordingly.

A further advantage is that, even for mass production, the electrical connection cable for the electrical coil can be led out easily. Leak-tightness of the magnetorheological brake device, and scaling, can be made possible using simple means.

In principle, by using longer rolling elements, a greater moment can be generated by the magnetorheological brake device, because the effective length is increased. Owing to the considerably further enlarged core area, it is ensured that the transmission components are always exposed to a corresponding magnetic flux density. The magnetic field strength in the "wedge" on the transmission component can be made higher than in the prior art. Long transmission components can be used, to which an adequately strong magnetic field can be conducted.

In particular, the magnetic field generated by the electrical coil passes radially through the core, and then through the rolling element, and is closed via the (sleeve part or) outer brake element. Here, the magnetic field lines are closed both in one half, for example the lower or left-hand half, and in the other half, for example upper or right-hand half, of the outer brake element. The paths are therefore short, resulting in a better response time (lower inductance or shorter time constant (tau)). In simple embodiments, the magnetic flux thus runs substantially two-dimensionally. Here, it is not important how long, short or tall the transmission components are. It is thus possible to implement any desired scaling in terms of length, because the magnetic field transmission area grows concomitantly. By contrast, in the case of electrical coils wound concentrically around the longitudinal direction of the first brake component (prior art), the cross-sectional area in the core always remains the same, and thus forms a bottleneck for the magnetic field as long as the diameter is not changed. A greater diameter of the first brake component however also changes the structural space requirement, the installation dimensions and the weight of the magnetorheological brake device. The moment arms and the rotational speeds of the rolling elements also change, which is not always advantageous. By contrast, these changes does not occur in the case of an enlargement of the available core cross section and a linear lengthening as in the case of the present invention.

If longer rolling elements are used, the braking effect of a long roller can be better than in the case of two short rollers that have the same total length. This is owing inter alia to the fact that the liquid must be displaced over a greater distance, because the edge is further remote (hydrodynamic pressure).

In preferred embodiments, the magnetorheological brake device has a diameter of the outer brake element (and thus of the second brake device) of between approximately 5 and 40 mm (+/−20%) and, in preferred embodiments, of approximately 10 to 20 mm.

Altogether, the invention provides an advantageous haptic operator control device with a magnetorheological brake device ("MR brake"). Here, the outer diameter of the MR brake is normally predefined, in particular in haptic applications. There are in this case ergonomic guidelines or structural space specifications. The core cross section therefore generally cannot be so easily enlarged, because this causes the outer diameter to also become larger (dial outer diameter; area for the fingers). Furthermore, with increasing outer diameter, a greater blocking moment is required again, because the moment arm would thus become greater. The finger force, that is to say that (tangential) force between the actuating finger(s) and the brake element or the outer surface of the brake element, must or should remain the same, because firstly only a certain force can be applied by the user, and the forces required at the fingers (fingertips) are important for comfort during actuation (operator control quality).

The invention achieves the aim of obtaining a haptic operator control device which is as simple as possible but which is nevertheless easily scalable and which has a high braking moment whilst being of compact outer diameter.

Potting of the electrical coil is advantageous in order that the MR liquid (carrier liquid) does not pass into the voids between the coil wires (capillary effect). This can otherwise lead to demixing. Instead of a (cylindrical) coil wire, use may also be made of a flat material composed of copper or some other suitable material.

The core, the rolling elements and the outer brake element may be manufactured from a simple steel (for example S235) that preferably has good magnetic characteristics, without stringent requirements being placed on surface condition and hardness. Use may however also be made of (multiple) rolling elements or balls or transmission components of some other shape (stacked one above the other). Spacers (guide plates) may be provided between the rolling elements.

The space (gap) that is still available adjacent to the electrical coil, between core and outer cylinder, need not imperatively be (approximately) completely filled with rolling elements. Use may also be made of spacers between the rolling elements, or one or more rolling elements or transmission components, composed of magnetically non-conductive material—together with rolling elements or transmission components composed of magnetically conductive material.

The opposing moment may be dissipated for example to a console, base plate, receiving plate, housing or some other part. The stator unit preferably has a bore through which the cables are led. A sealing element (for example O-ring) preferably seals off the cable with respect to the stator unit or the interior space, such that no liquid can pass out of the interior space via the cable. In addition to the (coil) cable, it is also possible for a temperature sensor cable or other sensor cable to be led through said opening.

The stator element may also be produced from a different material than the core, rolling element or the outer brake element. The preferred rolling element height is between 3 and 6 mm, though may also be 1 or 2 mm.

A decorative element or some other operator control element, for example a rubber-lined dial or a friction wheel or a special knurled wheel or the like, may be installed over the outer brake element.

It is preferable for at least one component through which the magnetic field flows to be composed at least partially or entirely of the material FeSi3P.

In particularly preferred refinements of the haptic operator control device for vehicles, the outer brake component, for the rotatability thereof about the inner brake component, is mounted on the support element by means of at least one bearing unit of at least one bearing device, such that, with the bearing unit, the outer brake component is mounted independently of the inner brake component.

It is preferable if the rotor unit, for the rotatability thereof about the stator unit, is mounted on the support element by means of at least one bearing unit of at least one bearing device, such that, with the bearing unit, the rotor unit is mounted independently of the stator unit.

In particular, the outer brake component is mounted in a radially outward direction on the support element by means of the bearing unit.

It is advantageous if the bearing unit is arranged on a radial outer side of the outer brake component, and if the outer brake component is arranged at least partially between the bearing unit and the inner brake component.

It is preferable if the bearing unit radially surrounds the outer brake component only partially. It is preferable if the bearing unit radially surrounds the outer brake component in positively locking fashion, such that the outer brake component cannot be separated from the bearing unit in a radial direction. In particular, the outer brake component is in this case mounted only with a radial sub-portion of its circumference on the support element.

The outer brake component is preferably not mounted on the inner brake component, and is preferably mounted only on the support element.

It is possible and preferable for at least one bearing unit to provide at least one fixed bearing for blocking axial mobility of the outer brake component, and/or for the at least one bearing unit to be assigned at least one travel limiting means for axial mobility of the outer brake component in at least one direction.

In particular, a shank of the inner brake component is arranged on the support element by means of at least one shank holder.

The stator unit is preferably arranged rotationally fixedly on the shank holder. In particular, the shank holder is arranged in axially displaceable fashion on the support element, and the shank holder radially surrounds the outer brake component at least in certain portions.

It is preferable for the outer brake component to be mounted in axially displaceable fashion on the support element.

In particular, the inner brake component is fastened only at one side to the support element, and/or is fastened only by way of one end portion of the shank to the support element.

At least one alignment device for aligning an axial central axis of the inner brake component, in particular for aligning the shank relative to an axial central axis or axis of rotation of the outer brake component, is preferably included.

It is preferable if at least one shank of the inner brake component can be aligned on the shank holder by means of the alignment device. In particular, for this purpose, the shank comprises at least one conical alignment portion that is arranged in and/or on a corresponding conical alignment part of the shank holder.

It is advantageous if the shank holder can be aligned on the support element, and/or the outer brake component can be aligned on the shank holder, by means of the alignment device.

In particular, the shank holder is at least partially of axially symmetrical configuration such that an axial central axis of a portion of the shank holder which radially surrounds the outer brake component, and an axial central axis of a portion of the shank holder to which the inner brake component is fastened, are arranged parallel and in particular in overlapping fashion.

The outer brake component may be mounted rotatably on a portion of the shank holder which radially surrounds the outer brake component.

It is preferable if a portion of the shank holder radially surrounds the outer brake component and is arranged, and preferably arranged rotationally fixedly, with its outer side at least partially in the support element.

In particular, a deceleration moment that arises during a deceleration of the rotational movement of the outer brake component can be dissipated via the inner brake component into the support element.

In particular, a pressure load that is exerted on the outer brake component during an operator control operation can be dissipated at least via the bearing unit, bypassing the inner brake component, into the support element.

In particular, the bearing device comprises at least one further bearing unit, and the outer brake component is in particular also mounted on the support element by means of the at least one further bearing unit.

The outer brake component comprises at least one operator control wheel, or is configured as an operator control wheel. The operator control wheel is preferably a finger roller, and may be designed similarly to a mouse wheel.

The magnetorheological medium comprises, in particular, particles that can be manipulated in targeted fashion by means of a magnetic field. In particular, the particles are included in a carrier medium. In particular, the carrier medium is provided by ambient air and/or by a fluid that differs from ambient air. The carrier medium may differ from ambient air at least inter alia in terms of pressure. For example, the particles may be included in negatively pressurized form, or under a vacuum, in a fluid or else in the ambient air or gas mixture. In particular, between the rotor unit and the stator unit, there is arranged a space or gap for the magnetorheological medium, which space or gap is adapted to the respective medium. The seal is preferably suitable and configured to outwardly seal off the gap for such a magnetorheological medium and for example for particles in air as a medium and/or in a liquid medium.

In particular, ferromagnetic and/or ferrimagnetic and/or superparamagnetic particles, and preferably at least particles composed of carbonyl iron powder, are provided. In the operator control device presented here, use may particularly advantageously be made of a magnetorheological medium that is provided in the form of carbonyl iron powder in ambient air. Use may additionally be made of additives which in particular improve lubrication. In particular, the particles have a distribution of the particle size of between one and twenty micrometers. Smaller particles (<1 micrometer) to very small particles (a few nanometers, typically 5 to 10 nanometers), or larger particles of thirty, forty and fifty micrometers, are also possible.

In one preferred refinement, the operator control device comprises a control device that is suitable and configured to brake the rotational movement of the operator control part by means of the in particular magnetorheological brake device in a manner dependent on an operating state of a motor vehicle. The operating state preferably comprises at least one driving operating mode and at least one standstill operating mode. The standstill operating mode comprises, in particular, at least one charging operating mode for a traction battery of an at least partially electrically operated vehicle.

In particular, the control device is suitable and configured to select and set or propose a function level that can be operated using the operator control part, and to do so in a manner dependent on the operating state, automatically, and preferably using a machine learning algorithm. In particular, the function level comprises at least one entertainment function. In particular, the entertainment function is selected in a manner dependent on the standstill operating mode. In particular, the function level comprises at least one driver assistance function. In particular, the driver assistance function is selected in a manner dependent on the driving operating mode.

It is preferable and advantageous if the control device is suitable and configured to block and/or not propose a function level, and to do so in a manner dependent on the operating state, automatically, and preferably using a machine learning algorithm. In particular, in a manner dependent on the driving operating mode, specifically those function levels which are likely to distract the driver, and/or which are legally prohibited during travel, are blocked and/or not proposed. In particular, information regarding which function levels should be blocked and/or not proposed may be stored in the control device.

Such refinements may, purely by way of example, be implemented as follows (here, individual features may also be implemented individually or in any desired combination with one another): electric/hybrid vehicles require more time for refueling (charging) than combustion engine vehicles. Depending on the charging structure and battery size, this may even take several hours. Even at fast-charging stations (800 volts), the charging operation takes significantly longer than refueling with fossil fuel. A motor vehicle is equipped with numerous operator control elements that are configured at least partially in the manner of the operator control part described here. During the charging operation (standstill operation), the adaptive (magnetorheological) operator control parts in the vehicle are haptically activated such that the driver can use them to pass the time or work (setting of entertainment functions). The vehicle together with the operator control part then becomes an office or gaming station. For example, an operator control part configured as a rotary wheel or thumb roller in the steering wheel or in the central console may be used as a computer mouse wheel, the head-up display, dashboard display or other (touch) displays may be used as a display unit, the lighting system may be used to create effects, and the speech input system may be used for example for the purposes of dictating texts. Even a multifunction seat (the massage function thereof) or the chassis (for example air suspension of an automobile or utility vehicle) may be incorporated in order to more realistically replicate particular game states. The turn signal levers, gear lever, paddle shift levers or pedals may be used as control elements in games, the (by-wire) pedals may be used for controlling an automobile in a game (for example Need for Speed . . . ), and the steering wheel, in particular in the case of automobiles with steer-by-wire, or everything together, may be used for operating a flight simulator/game. For this purpose, the haptics (force feedback), that is to say the force versus travel or the torque versus angle, must be variably set and adapted in accordance with requirements (in particular by the control device, which activates the brake device in targeted fashion). The haptic feedback of the thumb roller in the steering wheel is enhanced such that, for example in conjunction with an office application (PC), it is possible to scroll more easily through pages, with a short increase in force being perceptible at the user's finger at breaks between pages. The input wheel may made more difficult to rotate (or made to stop) at the end of pages, at the end of the view, at a zoom maximum/minimum, at the end of lists etc. Said input wheel is blocked if it is attempted to view prohibited sites (for example as a child safety facility on the Internet). The graduation of the input wheel can be activated and deactivated, and the intensity of the graduation can be varied. The graduation width may be set as desired by the user. File folders and file sizes are indicated by greater resistance when they are moved. When scrolling through folders, the resistance is higher in the case of large folders, and lower in the case of small and individual files. The thumb roller, which becomes a mouse wheel, may change its scrolling behavior when the cursor approaches a desired (favored) point (or fixed points, at constant intervals etc.). If the mouse wheel is used for gaming, the torque should generally be reduced (for example less than 1 Nm), because the adaptive rotary wheel is utilized for a much greater length time for this purpose than for the setting of a menu during driving, and thus involves greater strenuousness. During driving, or in the driving operating mode, the operator control elements should exhibit slightly heavier movement (higher torque or force; for example 2 Nm or higher), because the vehicle is subject to vibrations, and driving is a dynamic activity (with externally acting forces). User inputs can thus be generated more reliably. The use of the operator control element when at a standstill, or whilst the battery is being charged, is an entirely static activity, in which the operator control element is used for a long period of time and intensively but in a quiet environment. Excessively high forces or moments lead here to more rapid fatigue of the input elements (finger, hand, foot) and, in the case of highly intensive input, sometimes to inflammation (for example tendonitis). Furthermore, in games or office applications, the torque must be varied more finely and in a greater number of stages (in a more varied manner) and with different haptic curve profiles then during the operator control of the automobile. The modes are in particular programmable during use as a non-driving-specific operator control element, such that any user can implement their own ideas. For this purpose, a simple app may be implemented for the purposes of adapting individual haptic feedback actions. The haptics in the vehicle may also be adopted from a home games console or an office PC (for example, settings are stored in the cloud and adopted). However, the haptics should return to a standard mode in the case of driving-specific inputs in order that, here, the vehicle driver is provided with reproducible feedback for driving events, in particular if these are safety-relevant (for example cruise control system, clearance control system, accelerator, brake . . . ). The above is also advantageous for the rear seats in the automobile. There, too, the adaptive rotary actuator for the ventilation system or the input devices for the air-conditioning system can be haptically used as input devices for gaming. For example, whilst the battery is being charged, but also during driving, children can use the existing operator control elements in a multifunctional manner and thus pass the time. The vehicle however also be used as a "game simulator" or as a "driving school simulator" whilst in a garage, and not only whilst the battery is being charged. Such embodiments may also for other vehicles such as utility vehicles, off-highway vehicles, motorcycles, piste groomers, aircraft, bicycles . . . , that is to say vehicles that have operator control elements that can be adaptively altered.

Further advantages and features of the present invention will emerge from the exemplary embodiments, which will be discussed below with reference to the appended figures.

DETAILED DESCRIPTION OF THE INVENTION

Figure 1A:
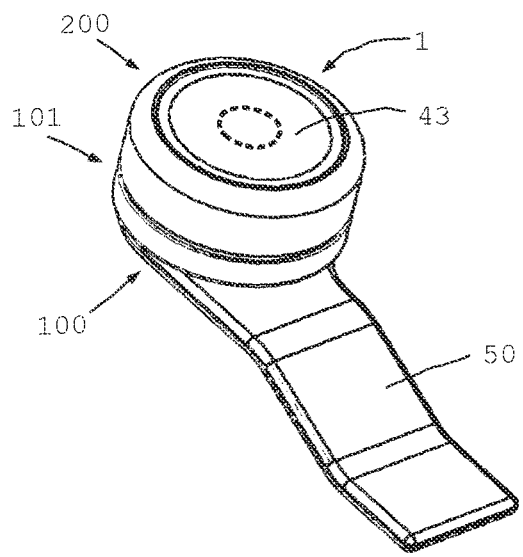
FIG. 1a shows a schematic three-dimensional view of a haptic operator control device for vehicles having a magnetorheological brake device.

FIG. 1a shows a haptic operator control device 100 for vehicles or equipment component 200 for vehicles, on which at least one magnetorheological brake device 1 and at least one operator control part 101 can be used or is included.

FIG. 1a shows a haptic operator control device 100, designed as a haptic operator control dial, for vehicles. The operator control dial is fastened in the vehicle via the console or a support element 50. For example, the operator control dial 101 may be attached to the dashboard. The operator control dial 101 is operated by rotation of the operator control part 101. The user interface 43 can additionally be used to impart information.

Figure 1B:
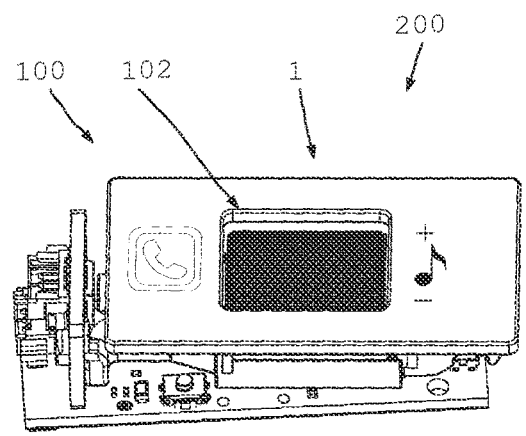
FIG. 1b shows a schematic three-dimensional view of a further haptic operator control device for vehicles having a magnetorheological brake device.

FIG. 1b illustrates the equipment component 200 as a haptic operator control device 100 with a thumb roller 102. The thumb roller 102 may preferably be used for example in steering wheels of vehicles. The thumb roller is however not limited to this application, and may also be installed for example in the central console of a vehicle. The thumb roller 102 may generally also be usable with any other finger, depending on the installation situation.

When the operator control part 101 or the thumb roller is not being operated, vibrations may be transmitted to it from the vehicle. For example, vibrations may be transmitted from the moving vehicle to the steering wheel or to the central console. A situation may then arise in which, for example, the operator control part or the thumb roller moves in an undesired manner as a result of the vibrations. In order that this does not occur, a small electrical current may be applied to the electrical coil 26a (cf. FIG. 3) of the thumb roller whilst the latter is not in use, which has the practical result of increasing the base moment. Here, the software monitors the operator control part 101. If the angle of rotation of the operator control part 101 (rotary dial, thumb wheel, thumb roller etc.) changes yet further even in the presence of a small electrical current, then it is the user that seeks to rotate the operator control part 101. The software then releases the operator control part 101 for rotation, and the change in angle is then transmitted (input). A touch sensor or near-field sensor may be used in order that the controller knows when the rotation is being initiated by the user and when it is not. This is expedient in particular if such sensors are already installed. A slight disadvantage is a slightly increased electrical current consumption and a slightly elevated base moment (sticking of the dial) upon commencement of the rotation.

In these exemplary embodiments, the magnetorheological brake device 1 has a rotatable operator control part 101. The torque required for the rotation of the operator control part 101 can be set by means of the magnetorheological brake device 1.

A user interface 43 may be arranged on the top side of the haptic operator control device 100. Such a user interface 43 may for example be configured as a display device or else as a touch-sensitive input means (touchpad, movement and gesture controller, image recognition means . . . ).

Figure 2:
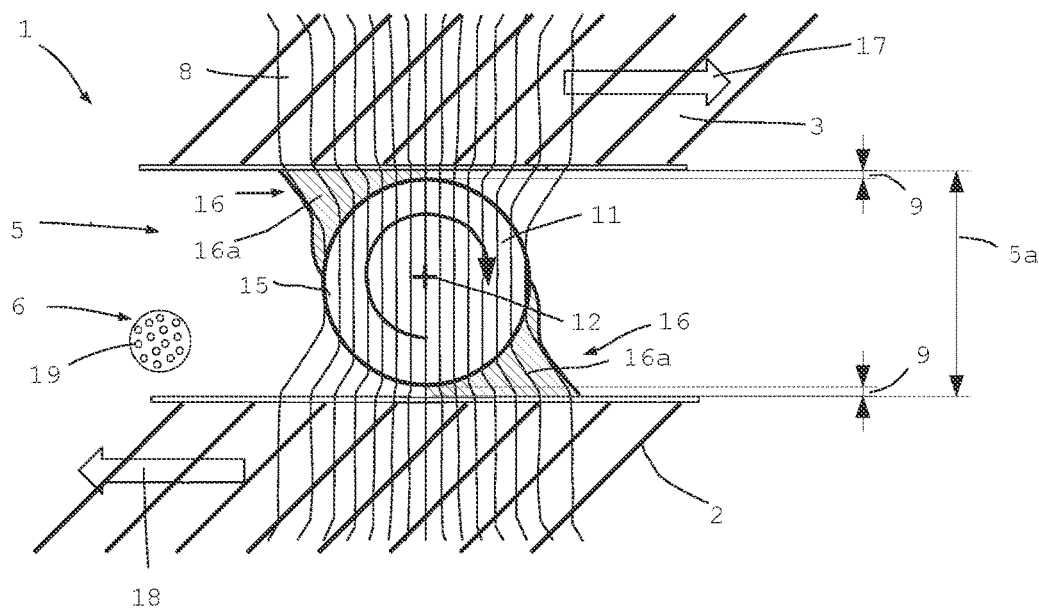
FIG. 2 shows a highly schematic cross section through a rolling element of a magnetorheological brake device.

FIG. 2 shows a highly schematic cross-sectional view of a magnetorheological brake device 1 for vehicles for influencing the transmission of force between two brake components 2 and 3. Here, a rolling element or rotary element 11 is provided between the two brake components 2 and 3 in FIG. 2. The rolling element 11 is configured here as a ball or roller 15. It is however likewise possible for rolling elements 11 to be configured as cylinders or ellipsoids, rolls or other rotatable rotary elements. Rotary elements that are not rotationally symmetrical in the true sense, such as a toothed gear or rotary element 11 with a particular surface structure, may also be used as rolling elements.

In all embodiments and designs, it is also possible for some or all rolling elements 11 to be used (not only for transmitting torque but also) for the mounting of the brake components 2 and 3 relative to one another, such that a separate bearing device 30 or separate bearing points are not required. In particularly simple designs, this may be realized by means of rolling elements 11 for example in the form of rollers composed of a magnetically non-conductive or magnetically approximately non-conductive material.

Between the brake components 2 and 3, there is provided a channel or gap 5 which has a gap width 5a and which in this case is filled with a medium 6. The medium is in this case a magnetorheological fluid which, for example, comprises an oil as carrier liquid, in which ferromagnetic particles 19 are present. Glycol, grease, silicone, water, wax and viscous or inviscid substances may also be used as carrier medium, though this list is not limiting. The carrier medium may also be gaseous and/or a gas mixture (for example air or ambient air, nitrogen, gas or gas mixture, air mixture), or the carrier medium may be omitted (vacuum or air, for example ambient air). In this case, the effective gap (gap) or channel is filled only with particles that are manipulable by way of the magnetic field (for example carbonyl iron). A mixture with other particles that preferably have lubricating characteristics, such as graphite, molybdenum, plastics particles or polymer materials, is possible. A combination of the stated materials may also be provided (for example carbonyl iron powder mixed with graphite and air as carrier medium). As carbonyl iron powder without (liquid) carrier medium, use may for example be made the powder with the designation CIP ER from the company BASF, with a minimum iron fraction of 97%, without a coating and with an average particle size of 5.1 μm, or else CIP SQ-R from BASF with an iron fraction of at least 98.5%, an average size of 4.5 μm and an SiO2 coating. The different powders differ in terms of the size distribution of the particles, in terms of the coating, in terms of the particle shape etc.

The ferromagnetic or ferrimagnetic particles 19 are preferably carbonyl iron powder with spherical microparticles, wherein the size distribution and shape of the particles is dependent on the specific usage situation. What is specifically preferred is a distribution of the particle size of between one and twenty micrometers, though smaller particles (<1 micrometer) to very small particles (a few nanometers, typically 5 to 10 nanometers), or larger particles of twenty, thirty, forty and fifty micrometers, are also possible. Depending on the usage situation, the particle size may also be considerably greater, and may even extend into the millimeter range (spherical particles). The particles may also have a special coating/casing (titanium coating, ceramic, carbon casing, polymer coating etc.) in order that they better withstand, or are stabilized with respect to, the high pressure loads that occur depending on the usage situation. The particles may also have a coating for preventing corrosion or electrical conduction. The magnetorheological particles may, for this usage situation, be produced not only from carbonyl iron powder (pure iron; iron pentacarbonyl) but for example also from special iron (relatively hard steel) or other special materials (magnetite, cobalt . . . ) or from a combination thereof. Superparamagnetic particles with low hysteresis are also possible and advantageous.

The rolling element 11 is preferably set in rotation about its axis of rotation 12 as a result of the relative movement 17 of the two brake components 2 and 3, and practically runs on the surface of the brake component 3. At the same time, the rolling element 11 runs on the surface of the other brake component 2, such that a relative speed 18 prevails there.

Specifically, the rolling element 11 does not make direct contact with the surface of the brake components 2 and/or 3 and therefore does not roll directly thereon. The free spacing 9 from the rolling element 11 to one of the surfaces of the brake components 2 or 3 is for example 140 μm. In a specific embodiment with particle sizes between 1 μm and 10 μm, the free spacing is in particular between 75 μm and 300 μm, and particularly preferably between 100 μm and 200 μm.

The free spacing 9 amounts in particular to at least ten times the diameter of a typical average particle diameter. The free spacing 9 preferably amounts to at least ten times a largest typical particle. Owing to the absence of direct contact, there is a very low base friction/force/moment during the relative movement of the brake components 2 and 3 with respect to one another.

If a magnetic field is applied to the magnetorheological brake device 1, the field lines form in a manner dependent on the spacing between the rolling elements 11 and the brake components 2, 3. The rolling element 11 is composed of a ferromagnetic material, and in this case for example of ST 37 (S235). The steel type ST 37 has a magnetic permeability μr of approximately 2000 (in the relevant range). The field lines (magnetic circuit) pass through the rolling element and are concentrated in the rolling element. At the surfaces at which the field lines in this case radially enter and exit the rolling element, there is a high magnetic flux density in the channel or gap 5. The inhomogeneous and strong field there leads to local and strong cross-linking of the magnetically polarizable particles 19 (magnetic interlinking). The rotational movement of the rolling element 11 in the direction of the wedge that forms the magnetorheological fluid causes the action to be greatly intensified, and the possible braking or coupling moment is increased to an extreme degree, far beyond the value that can normally be generated in the magnetorheological fluid. Rolling element 11 and brake components 2, 3 are preferably composed at least partially of ferromagnetic material, as a result of which the magnetic flux density becomes higher the smaller the spacing is between rotary element 11 and brake components 2, 3. As a result, a substantially wedge-shaped region 16 forms in the medium, in which region the gradient of the magnetic field greatly increases toward the acute angle 16a at the contact point or in the region of the smallest spacing.

Despite a spacing between rolling element 11 and brake components 2, 3, the rolling element 11 can be set in rotational movement as a result of the relative speed of the surfaces with respect to one another. The rotational movement is possible in the absence of and also in the presence of an acting magnetic field 8.

If the magnetorheological brake device 1 is exposed to a magnetic field 8 of an electrical coil 26a (not illustrated here in FIG. 2, cf. for example FIG. 3), the individual particles 19 of the magnetorheological fluid 6 interlink along the field lines of the magnetic field 8. It is to be noted that the vectors plotted in FIG. 2 only roughly schematically represent that region of the field lines which is of relevance for the manipulation of the MRF. The field lines enter the channel 5 substantially normally with respect to the surfaces of the ferromagnetic components, and need not run rectilinearly in particular in the acute-angled region 16a.

At the same time, on the circumference of the rolling element 11, material of the magnetorheological fluid is set in rotation to a certain degree, such that an acute-angled region 16a forms between the brake component 3 and the rolling element 11. An identical acute-angled region 10 forms between the rolling element 11 and the brake component 2 on the other side. The acute-angled regions 10 may, for example in the case of cylindrical rolling elements 11, have a wedge shape 16. Owing to the wedge shape 16, the further rotation of the rolling element 11 is impeded, such that the action of the magnetic field on the magnetorheological fluid is intensified, because the magnetic field acting within the acute-angled region 16a causes greater cohesion of the medium 6 situated there. The action of the magnetorheological fluid in the built-up accumulation (the interlinking in the fluid and thus the cohesion or the viscosity) is thus intensified, which hinders the further rotation or movement of the rotary element 11.

Owing to the wedge shape 16 (particle accumulation), significantly greater forces or moments can be transmitted than would be possible with a similar design that utilizes only the shear movement without a wedge effect.

The forces that can be directly transmitted by way of the applied magnetic field constitute only a small fraction of the forces that can be transmitted by means of the device. The wedge formation and thus the mechanical force intensification can be controlled by means of the magnetic field. The mechanical intensification of the magnetorheological effect may be of such magnitude that a transmission of force is possible even after an applied magnetic field has been withdrawn, if the particles have been caused to form a wedge.

It has been found that, owing to the wedge action of the acute-angled regions 16, a considerably greater action of a magnetic field 8 of a particular strength is achieved. Here, the action may be intensified several times over. In one specific case, it was observed that the relative speed of two brake components 2 and 3 with respect to one another was manipulated to an extent approximately ten times that encountered in the case of the prior art with MRF couplings operating in accordance with the shear principle, where a magnetorheological fluid is arranged between two surfaces that move with respect to one another and is exposed to the shear forces of the surfaces that are moving with respect to one another. The intensification that is possible here by means of the wedge action is dependent on various factors. It may optionally be further intensified by way of a greater surface roughness of the rolling elements 11. It is also possible for outwardly protruding projections to be provided on the outer surface of the rolling elements 11, which projections can lead to greater wedge formation.

The wedge action or the wedge effect is distributed areally on the rolling element 11 and the components 2 or 3.

Figure 3:
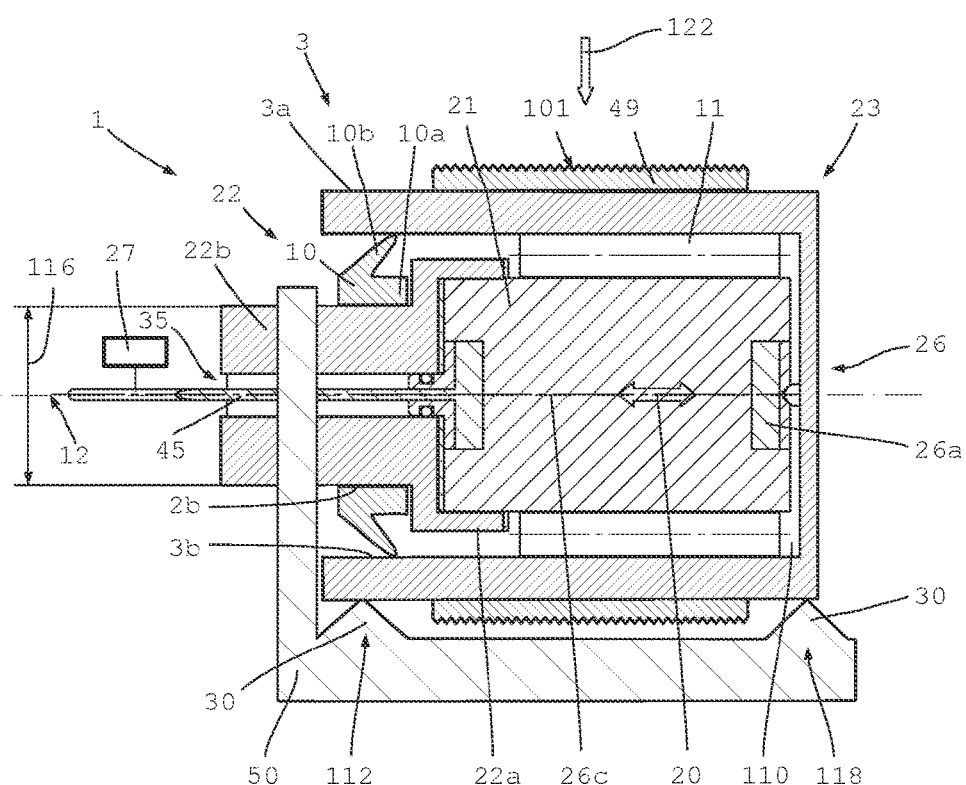
FIG. 3 shows a schematic cross section through a haptic operator control device for vehicles having a magnetorheological brake device.

FIG. 3 shows a section through a haptic operator control device 100 with a magnetorheological brake device 1 that has two brake components 2 and 3. The first brake component 2 and the second brake component 3 extend substantially in an axial direction 20.

The first brake component 2 is in this case arranged in the interior of the second brake component 3 and is configured as a stator unit 22, which stator unit is surrounded by the rotor unit 23, which is rotatable around said stator unit. The stator unit 22 has a stator shank or shank 22b and a stator element 22a. The stator element 22a is held in positively locking and/or non-positively locking fashion by a support element 50. The support element 50 may for example be fastened to an external console or to an item of equipment, for example to the central console or to the dashboard or else to the door. The support element 50 is generally fastened in a rotationally fixed manner. Here, the first or inner brake component 2 is connected rotationally fixedly to the support element 50. For this purpose, the shank 22b of the stator unit 22 is held, in a manner secured against rotation, on the support element 50. The second brake component 3 is held on the first brake component 2 so as to be continuously rotatable relative thereto.

The second or outer brake component 3 is of elongate form and has the brake element 3a. The outer brake component 3 in this case forms a rotor unit 23 which is rotatable about the stator unit 22 and in the case of which the magnetically conductive brake element 3a forms the magnetically conductive rotor element 23b. The operator control element 101 is in this case coupled to or formed by the rotor element 23b, such that a rotational movement of the operator control part 101 is converted into, or directly causes, a rotational movement of the rotor element 23b. A lining 49 may be arranged on the operator control part 101, which lining is actually touched during operator control operations. It is for example also possible for a larger and optionally very narrow wheel to be attached for this purpose.

The second and outer brake component 3 is held rotatably on the support element 50 at the bearing device 30. The bearing device 30 in this case comprises a first bearing unit 112 and a second bearing unit 118. The inner brake component 2 is held rotationally fixedly, and optionally axially displaceably, on the support element 50. At the bearing units 112, 118 of the bearing device 30, forces in a global radial direction 122 can be supported by means of the bearing device 30, whilst the first brake component 2 is displaceable axially relative to the second brake component 3.

Between the brake components 2 and 3, there is formed a closed chamber or brake chamber 110 which is filled with MRF and which is sealed off to the outside by means of a seal 10. The seal 10 reliably seals off the interior and has a seal base 10a and a seal lip 10b. The seal base 10a bears, radially at the inside and in a parallel manner, against the stator shank 22b. The seal lip 10b bears, radially at the outside, against the inner circumference of the brake element 3a of the outer brake component 3. The brake component 3 has, at the rotor element, a cylindrical inner diameter that delimits the brake chamber 110 radially to the outside. The seal lip 10b abuts obliquely from the inside against the cylindrical inner wall. The seal 10 has in this case an approximately U-shaped or V-shaped cross section. The "U" or "V" is in this case open to the interior space of the brake chamber 110. This results in an intensification of the sealing action from the inside out.

This design is highly advantageous. No high loads arise in the contact portion 2b of the stator unit 22 with respect to the seal base 10a. It is thus possible to select an inexpensive material, for example a plastic, for the stator shank 22b. The stator unit can thus be produced for example as a single piece, or in particular in multiple pieces, in an injection molding process. The stator shank does not need to have any particular hardness in order to prevent wear, because no frictional abrasive contact movement occurs between the seal 10 and the stator shank 22b. It is not necessary for a sleeve composed of a relatively durable material, such as metal, to be attached to the stator shank. Since no sliding relative movement of a seal lip against the stator shank occurs, there is also no need for protection against the mechanical action of a seal lip against the inner brake component 2.

By contrast, the outer brake component 3 or the brake element 3a of the outer brake component 3 is magnetically conductive. The magnetic field 8 of the magnetic field source 26 is conducted through the magnetically conductive brake element 3a and is therefore composed of a much more abrasion-resistant material than the shank of the inner brake component 2. The magnetically conductive brake element 3a may optionally also, on the inside in the contact region 3b with respect to the seal lip 10b (or else in its entirety), exhibit additional hardening or have an additional hardening coating. In general, however, the material properties of the magnetically conductive material of the brake element 3a, such as steel, are sufficient to be able to ensure adequate durability. Although a low base moment is essential for the rotation of the operator control part 101 in the applications, it has been found that the design with the seal lip 10b radially to the outside, which is inherently less favorable in terms of friction, leads overall to better results than a reversed design. This is the case despite the fact that the friction moment is inherently greater owing to the greater circumference of the friction surface and owing to the greater diameter. The reasons for this are the simplified design and the reduction of the number of parts and the reduced structural space. Altogether, an extremely compact design is made possible, which exhibits only a minimal base moment and a very high maximum braking moment. Owing to the particularly compact design, the dimensions can be reduced yet further, whereby the base moment can also be reduced once again. This was an unexpected result.

The first brake component 2 has a stator element 22a and a core 21 received thereon. The windings of an electrical coil 26a are wound around the core 21. Here, the individual windings of the electrical coil 26a may protrude outwardly beyond the cylindrical stator element 22a, as shown in FIG. 4b. It is however also possible for the windings of the electrical coil 26a not to protrude.

Radially between the outer wall of the first brake component 2 and the inner wall of the outer brake element 3a, there is a gap 5, which in this case is configured substantially as a hollow cylindrical gap. Multiple transmission components 11, which are configured here as rolling elements, are arranged in the gap. The rolling elements 11 are in this case configured as cylindrical rolling elements and have an outer diameter somewhat smaller than the gap width of the gap 5. The gap 5 is in this case furthermore filled with a magnetorheological medium.

In one region of the gap, there may for example be arranged an O-ring or the like which is filled with air or some other gas and which provides volume compensation in the event of temperature fluctuations. Furthermore, a reservoir is thus formed there if magnetorheological fluid or medium escapes out of the interior during the course of operation. Here, the stator element can move axially in order to provide automatic temperature compensation and a reservoir for MRF.

The (usable) gap length of the gap 5 is in this case greater than the length of the rolling elements 11. Here, it is also the case that the electrical coil 26a is longer in the axial direction 20 than the length of the rolling elements 11.

In the interior of the electrical coil 26a, it is possible to see the core 21. The stator element 22a has a radially enlarged receptacle. Through the shank 22b, a cable leadthrough 35 extends downward through the shank 22b. Cables 45 for the connection of the electrical coil 26a, and optionally sensor lines, are led out there. A control device 27 may be provided in or assigned to the foot of the shank 22b or other suitable locations—even externally—in order to perform control as required.

The brake chamber 110 is configured to be closed to the outside. The closed chamber 110 comprises the volume 114, which is substantially completely filled with the magnetorheological medium 6.

A change in the volume of the magnetorheological medium 6 leads here to a relative axial displacement of the first brake component 2 with respect to the second brake component 3.

In the event that the first brake component 2 is static, the second brake component 3 is displaced to the right in the orientation of FIG. 3 in the event of an increase in volume. This causes the volume 114 of the closed chamber 110 to be enlarged. It is thus possible in particular for a change in volume of the magnetorheological medium 6 caused by a temperature increase to be compensated. A function of the magnetic field source 26 is not influenced by this. In the event of a decrease in volume, which may arise owing to temperature or else as a result of a leak, the second brake component 3 is displaced in this case to the left.

Ambient pressure practically always prevails within the magnetorheological brake component 1 during the displacement. In particular, an additional load on the seal 10 is thus prevented. By contrast, in the case of a compensation device that uses a gas bladder, the interior space is always subject to a positive pressure, resulting in more leakage and greater friction owing to the better seal that is required.

Figure 4A:
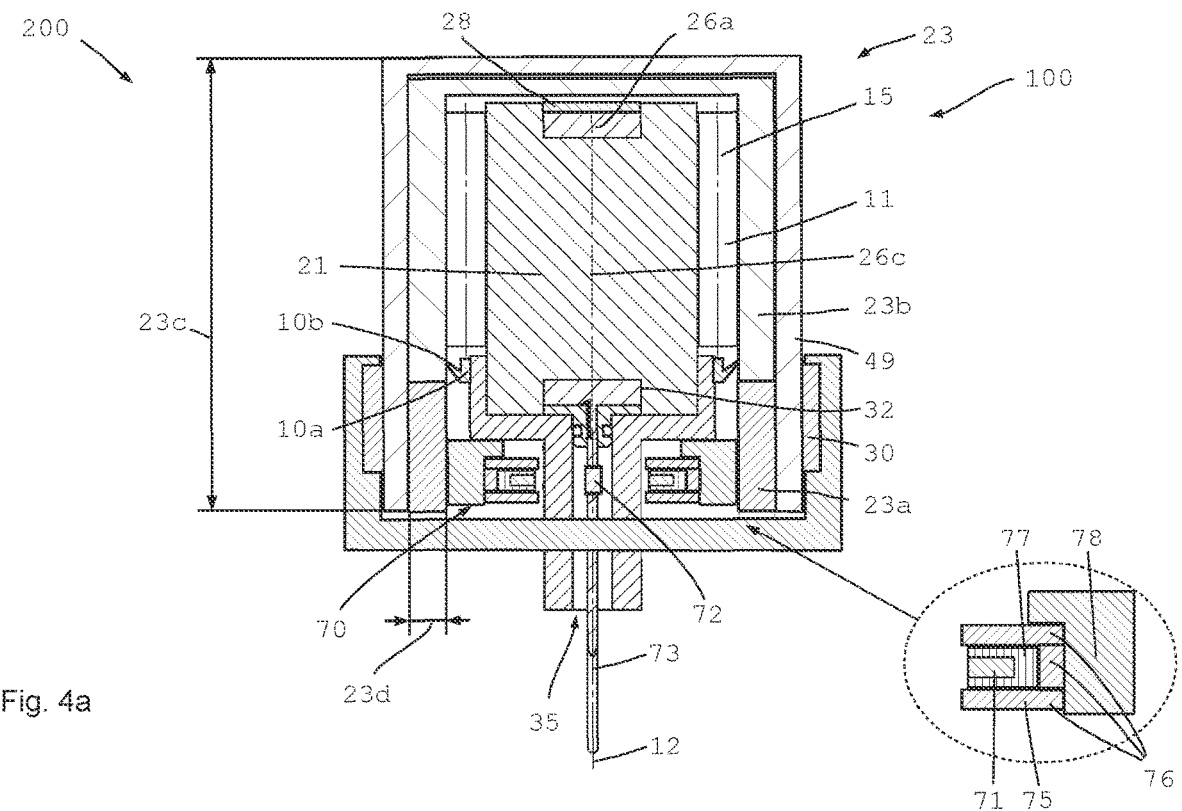
FIGS. 4a-4c show various cross sections through further haptic operator control devices for vehicles.
Figure 4B:
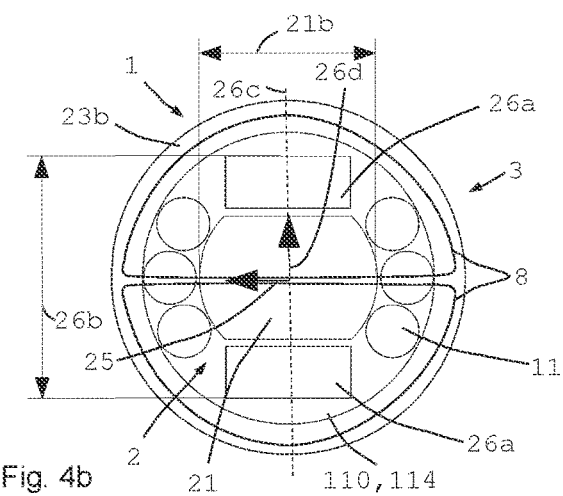

FIG. 4a shows another haptic operator control device 100 in section with a similar magnetorheological brake device 1. The transverse grooves 32 in which the electrical coil 26a is wound on the axial ends of the core 21 can be seen. Potting compound 28 is provided at each of the two ends in an axial direction in order to provide terminations. A separate seal is provided, for example by way of the illustrated O-ring or the like, in the region of the cable leadthrough 35. There, no relative movement occurs at the O-ring.

It is also possible for some of the rolling elements that are arranged so as to be distributed over a part of the circumference to be configured as magnetically non-conductive transmission components. It is preferable for all rolling elements to be composed of magnetically conductive material such as steel.

A length or height 23c of the operator control part 101 or of the rotor element 23 of the second brake component 3 in an axial direction 20 is preferably between 5 mm and 90 mm. It is possible, and indicated in FIG. 4a, that a separate sleeve 23a is attached to the end of the brake element 3a with the stator shank 22b, which sleeve lengthens the brake element 3a. Such a sleeve 23a need not be composed of a magnetically conductive material, and is preferably not composed of such a material here. Such a sleeve 23a increases the axial spacing of the electrical coil 26a and of the magnetically conductive brake element 3a from the sensor device 70, such that even better magnetic decoupling of the measurement results is achieved.

The sensor device 70 serves for detecting an angular position of the two brake components 2, 3 relative to one another, cf. the enlarged detail at the bottom right in FIG. 4a. The detection is performed by means of a magnet ring 71 and by means of a magnetic field sensor 72. The sensor device 70 is connected here via a decoupling device 78 to the second brake component 3. The decoupling device 78 magnetically decouples the sensor device. The sensor device 70 in this case furthermore comprises a shield device 75, which in this case comprises multiple shield elements 76 and surrounds the magnet ring unit 71 on three sides. A separating unit 77 is provided between the magnet ring unit and the shield device 75. The separating unit 77 additionally shields the magnet ring unit 71. In this way, the volume spanned by the magnet ring unit 71 is substantially shielded from magnetic influences of the electrical coil 26a or other magnetic fields.

A lining 49 may be applied to the outside of the second brake component 3, such that the external appearance of the rotary dial 23 is determined substantially by the surface of the lining 49.

The material of the brake element 3a or of the rotor element 23b is magnetically conductive and serves for closing the magnetic circuit. A wall thickness 23d of the rotor element 23b is preferably at least half a diameter of the rolling elements 11.

It is preferable for the core 21 and the stator shank 22b to be formed in two parts. The parting preferably runs along the center line shown in FIG. 4a, resulting in a left-hand and a right-hand (core) half. The two core halves may be spaced apart from one another by means of a magnetically non-conductive element (for example seal). The potting compound volume 28 is then preferably a part of the core half (halves), resulting in a semicircular element with an encircling groove on the parting surface for the electrical coil. It is furthermore preferable for the stator element 22a to also be divided into two halves. One half of the stator element 22a may also form one part with (be formed integrally with) one core half, or one core half may be formed integrally with one complete receiving unit.

Here, the haptic operator control device 100 with the magnetorheological brake device 1 is mounted in cantilevered fashion. The second brake component 3 is mounted here only at the first end of the closed brake chamber 110. The mounting is realized on the outside of the outer brake component 3 by means of a bearing device 30.

In the event of a change in the volume within the closed brake chamber, the first brake component 2 can move back and forth easily. It is again assumed here that the first brake component 2 is not rotating and is received in axially displaceable fashion. The system is advantageously practically always at ambient pressure within the given movement clearance. Additional loading of the seal 10 is prevented.

Figure 4C:
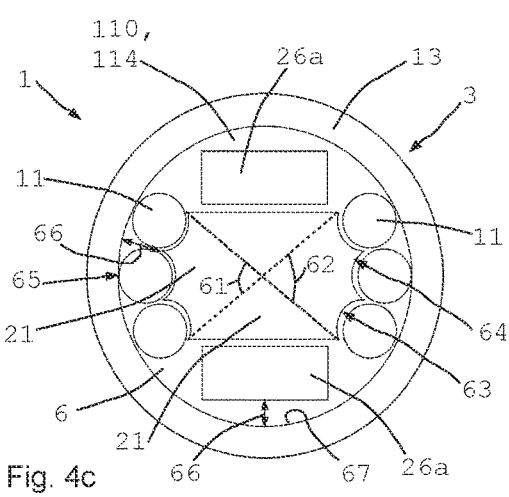

FIGS. 4b and 4c show different schematic cross sections of the magnetorheological brake device 1 that can be used in the embodiment as per FIG. 4a and in other exemplary embodiments.

The inner brake component 2 is configured to be static and is surrounded by the continuously rotatable brake component 3. The second brake component 3 has a magnetically conductive brake element 3a, which is rotatable about the first brake component and which is internally cylindrical. It is possible to clearly see the encircling gap 5 between the first and the second brake component 2, 3. The gap 5 is in this case at least partially, and in particular completely, filled with a magnetorheological medium 6.

The first brake component 2 has the core 21, which extends in the axial direction 20 and which is composed of a magnetically conductive material, and an electrical coil 26a, which is wound in an axial direction 20 around the core 21 and spans a coil plane 26c. The magnetic field 8 of the electrical coil 26 extends transversely with respect to the axial direction 20 through the first brake component 2 or the core 21.

It can be clearly seen that a maximum outer diameter 26b of the electrical coil 26a in a radial direction 26d within the coil plane 26c is greater than a minimum outer diameter 21b of the core 21 in a radial direction 25 transverse, and for example perpendicular, with respect to the coil plane 26c.

The rolling elements 11 are arranged in each case only in angle segments 61, 62, and cannot rotate all the way around the core 21, because the electrical coil 26a projects into the gap 5 or channel and thus prevents a complete revolution.

This means that less space is available for the rolling elements 11. This however leads to an even greater concentration of the magnetic field 8. Three magnetic field lines are plotted by way of example in FIG. 4b.

In FIG. 4c, the rolling elements 11 are received not on a cylindrical outer surface of the core 21 but on receptacles 63 which are specially adapted to the contour of the rolling elements 11 and on which the rolling elements 11 are received and guided preferably with a certain degree of play. The transition of the magnetic field 8 into the rolling elements 11 is advantageous because a larger transmission area is available between the core 21, or the outer surface 64 at the receptacles 63, and the rolling elements 11.

Here, the cross section as per FIG. 4c preferably exists only in axial end regions, such that the rolling elements 11, which are for example cylindrical, are guided, and held in a defined manner in a circumferential direction, at the ends by the receptacles 63. Over the central portion, the core is then configured as in FIG. 4b.

The electrical coil 26a is in any case arranged outside the angle segments 61 and 62. In this case, no rolling elements 11 are situated outside the angle segments 61 and 62.

Designs are also possible in which rolling elements 11 are omitted entirely. The cores 21 then have outwardly protruding transmission components 11 which extend radially outward from the main element 33. The maximum outer diameter 26a of the coil 26 is in this case greater than the minimum core diameter 21b. The radial extent of the gap 5 varies over the circumference. There is only a small gap dimension 65 at the outer ends of the transmission components 11, whilst a radial spacing 66 between the brake component 2 and the brake component 3 is considerably greater at other locations.

In all exemplary embodiments, use is preferably made of a "horizontal or axial coil" in the case of which the electrical coil 26a is wound in an axial direction 20 around the core 21 and again has a maximum radial coil diameter 26b that is greater than a minimum core diameter 21b of the core 21. The rolling elements 11 or transmission elements are then not arranged over the entire circumference.

In every embodiment, it is preferable for a sensor device 70 for detecting an angular position of the haptic operator control device 100 to be provided. The magnetic field sensor 72 is preferably integrated in or on the shank 22b or the first brake component 2.

The stator unit 22 is in particular of two-part design. This simplifies in particular the installation of the electrical lines and in particular of the sensor line 73 within the first brake component 2. The cables can be routed through the open cable leadthrough 35.

Figure 5A:
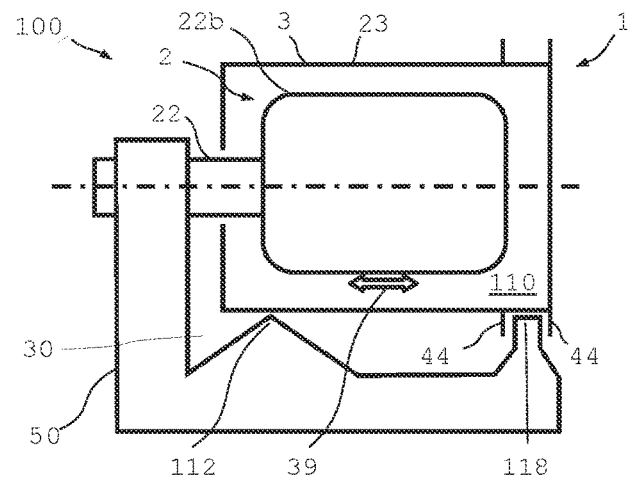
FIGS. 5a-5e are purely schematic illustrations of further embodiments of the haptic operator control device for vehicles in sectional side views.

FIG. 5a shows a haptic operator control device 100 that can be used on various equipment components 200 in the vehicle. The haptic operator control device 100 comprises a rotatable operator control part 101 with a rotor unit 23. Operator control is performed by rotating the rotor unit 23.

The rotor unit 23 is mounted so as to be rotatable about a stator unit 22. Here, the stator unit 22 comprises a stator element 22a and a stator shank 22b. The axis of rotation of the rotor unit 23 is illustrated here by a dash-dotted line. The axis of rotation in this case simultaneously also corresponds to an axial central axis of the stator unit 22 and of the rotor unit 23.

The stator unit 22 is fastened to a support element 50.

The rotational movement or rotatability of the rotor unit 23 about the stator unit 22 can be decelerated in targeted fashion here by means of a magnetorheological brake device 1. The brake device 1 uses a magnetic field source 26 (not illustrated in any more detail here), and for example an electrical coil 26a, to generate a magnetic field that acts on a magnetorheological medium (MR liquid) as brake medium. This leads to strong local cross-linking of magnetically polarizable particles and to an increase in the shear stress that can be transmitted in the brake medium.

The brake device 1 thus allows targeted deceleration (braking) and even complete blocking of the rotational movement (high braking moment). It is thus possible by means of the brake device 1 to implement haptic feedback during the rotational movement of the rotor unit 23, for example by way of a correspondingly perceptible graduation (ripple) or by means of dynamically settable stops. In order to be able to monitor the rotational position of the rotor unit 23 and use this for activating the brake device 1, a sensor device 70 (not shown here, cf. FIG. 4a) is provided.

The brake medium is received in an outwardly sealed brake chamber 110. The brake chamber 110 is in this case delimited by the rotor unit 23 and the stator unit 22.

The rotor unit 23 is in this case held (only) on the support element 50 (for the dissipation of the reaction torque that is generated as a result of the braking operation). In this way, the axial dimensions of the operator control device 100 can be considerably reduced, which is a major advantage for example for installation in a steering wheel of a vehicle. Furthermore, a mounting of the rotor unit 23 that is independent of the stator unit 22 is provided here. It is thus possible for the bearing forces and pressure loads during finger-imparted rotation to be dissipated, bypassing the stator unit 22, directly into the support element 50. The stator unit experiences only the reaction torque and no bearing or radial forces, for which reason the stator shank 22b can be dimensioned to be thinner and thus more space-saving. The overall result is particularly compact and robust and at the same time haptically precise operator control.

Here, a bearing device 30 with a bearing unit 112 and with a further bearing unit 118 is provided for the mounting of the rotor unit 23. By means of the bearing units 112, 118, the rotor unit 23 is mounted or supported radially at the outside on the support element 50. For this purpose, the bearing units 112, 118 are in this case arranged on the radial outer side of the rotor unit 23.

In the region of the further bearing unit 118, travel limiting means 44 are in this case arranged on the rotor unit 23. An axial displacement of the rotor unit 23 by a defined travel is thus made possible. The travel limiting means 44 may also be arranged so as to block axial mobility.

If axial mobility of the rotor unit 23 relative to the support element 50 is undesired, it is also possible for one or both bearing units 112, 118 to be configured as fixed bearings. Here, it is for example possible for the further bearing unit 118 to be configured as a fixed bearing.

In order to allow or compensate for temperature-induced or leakage-induced changes in volume of the brake medium in the brake chamber 110, the volume of the brake chamber 110 can be adapted. For this purpose, the rotor unit 23 and the stator unit 22 are in this case configured to be axially displaceable relative to one another. The movement for such volume compensation 39 is depicted here by a double arrow.

In the event of volume compensation 39, the stator shank 22 is in this case pushed out of the brake chamber 110 or pushed into the chamber. For this purpose, the stator shank 22b is in this case held in axially displaceable fashion on the support element 50. In order that, during a deceleration of the rotational movement, the deceleration moment can be dissipated into the support element 50, the stator shank 22b is however also attached rotationally fixedly to the support element 50.

Figure 5B:
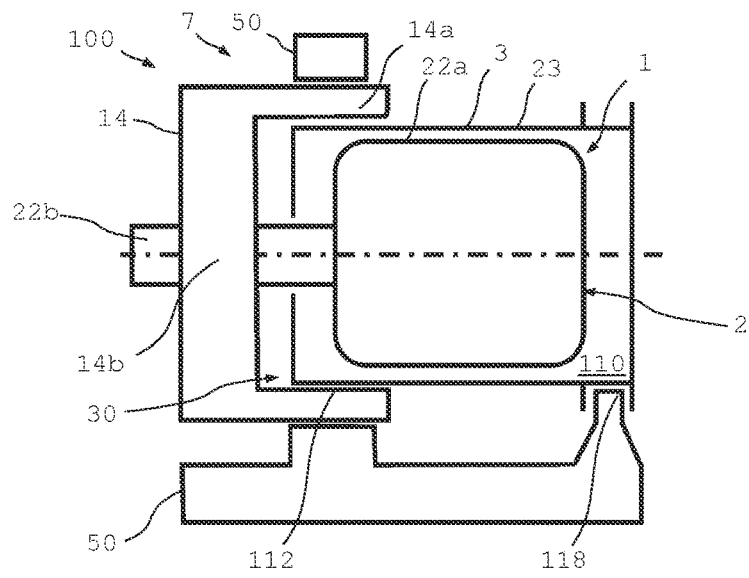

FIG. 5b shows a refinement of the above-presented haptic operator control device 100 for vehicles from FIG. 5a. Here, the stator unit 22 is fastened by way of a shank holder 14 to the support element 50. The shank holder 14 is arranged in axially displaceable fashion on the support element 50. By contrast, the stator unit 22 is fastened rotationally fixedly, and axially immovably, to the shank holder 14.

The stator unit 22 thus moves, together with the shank holder 14, relative to the support element 50 during volume compensation. Owing to the shank holder 14 and its correspondingly large radius, the axial movement can in this case be supported over a relatively large range (large areas; large spacings), resulting overall in improved axial guidance and alignment.

Here, by way of a portion 14a, the shank holder 14 surrounds the outer side of the rotor unit 23 in certain portions. The bearing unit 112 is arranged on the shank holder 14, such that the rotor unit 23 is mounted on the support element 50 via the shank holder 14. In this way, too, the mounting and axial displaceability and alignment of the components are improved.

Here, the haptic operator control device 100 comprises an alignment device 7 for aligning the axial central axis of the stator unit 22 relative to the axial central axis or the axis of rotation of the rotor unit 23. Here, for the alignment device 7, the shank holder 14 is axially symmetrical. In this way, that portion 14a of the shank holder 14 which radially surrounds the rotor unit 23, and on which the bearing unit 112 is also arranged, and a portion 14b of the shank holder 14, have a common axial central axis. The portion 14b serves here for the fastening of the stator shank 22b.

In this way, the shank holder 14 allows precise concentric alignment of rotor unit 23 and stator unit 22 and is at the same time also aligned with respect to the support element 50. For example, such an alignment device 7 may be provided by virtue of the shank holder 14 being configured as a rotary part with a relatively large central bore for the portion 14a and a relatively small central bore for the portion 14b.

Figure 5C:
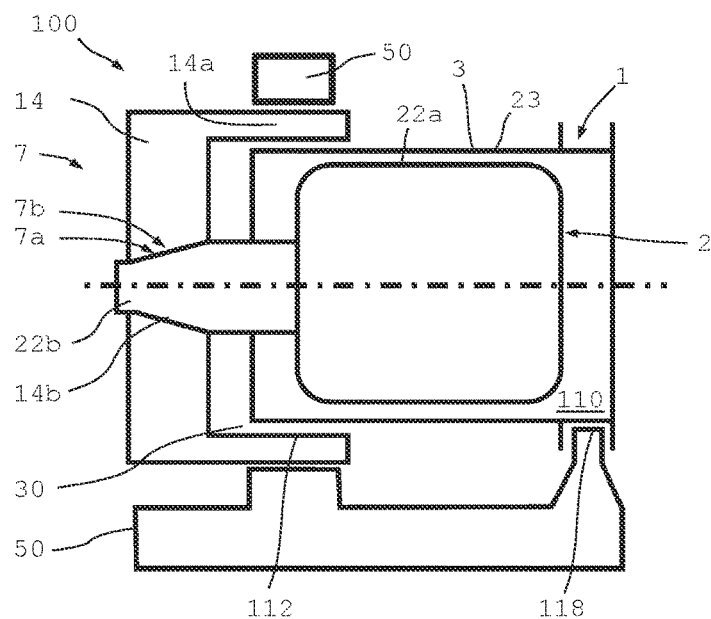

FIG. 5c shows the operator control device 100 presented with regard to FIG. 5b, with an enhanced alignment device 7, by means of which even more precise alignment of the stator shank 22b on or in the shank holder 14 is achieved. For this purpose, the stator shank 22b comprises a conical alignment portion 7a. The alignment portion 7a is arranged in a corresponding conical alignment part 7b of the shank holder and for example a conical recess. In this way, the stator unit 22 is aligned optimally (without play and concentrically) as it is joined together with the shank holder 14.

The stator shank 22b may also be aligned in the shank holder by means of a conical chuck. Additionally or alternatively, the stator shank 22b may be screwed or fixed in some other non-positively locking or positively locking manner in the shank holder 14. Cohesive fixing, for example by (ultrasound) welding or adhesive bonding, is also possible.

Figure 5D:
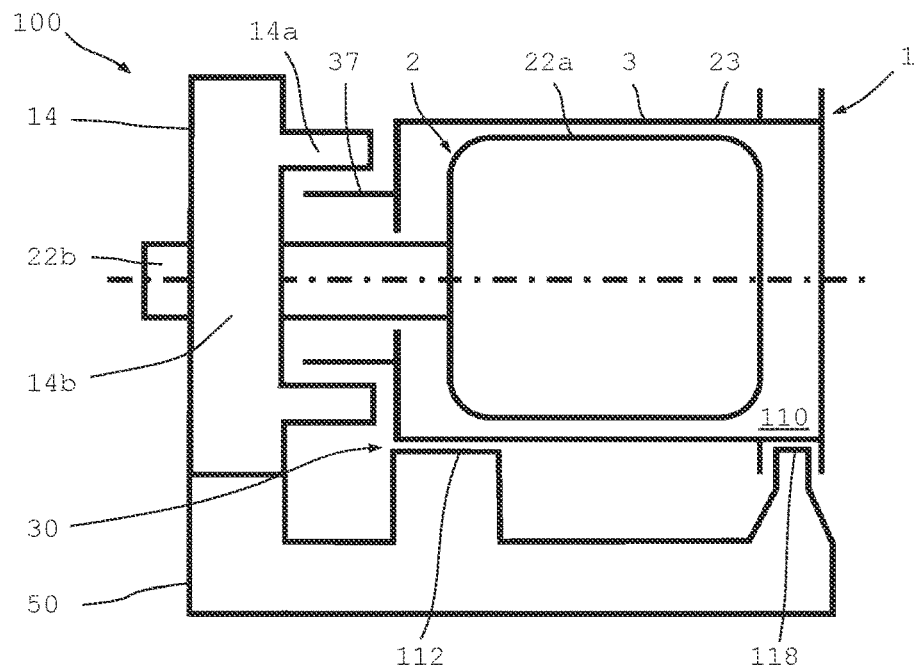

FIG. 5d shows the operator control device 100 presented with regard to FIG. 5c, with an alternative arrangement of shank holder 14 and rotor unit 23. Here, by way of its portion 14b, the shank holder engages around a radial outer side, formed here as a projection 37, of the rotor unit 23. Aside from the advantages discussed above, such an embodiment offers particularly small radial dimensions.

Here, both bearing units 112, 118 are arranged directly on the support element 50. Alternatively or in addition, mounting on the projection 37 is however also possible.

Figure 5E:
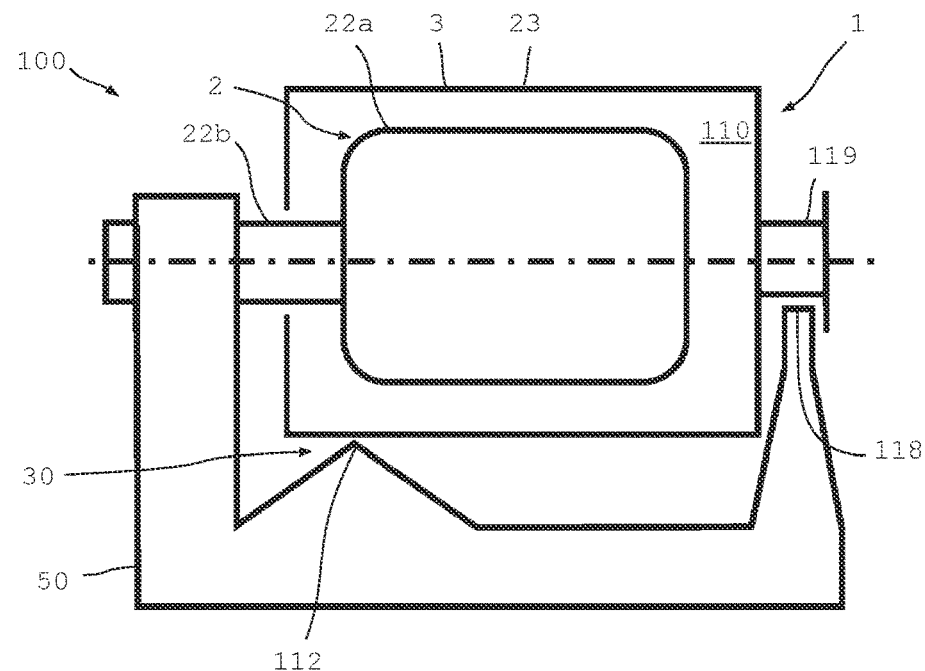

FIG. 5e shows the operator control device 100 presented with regard to FIG. 5a, with an alternative bearing arrangement. Here, the rotor unit 23 has, at one axial end, a projection in the form of an axle stub 119, on which the bearing unit 118 is arranged. This embodiment has advantages depending on the available structural space.

A further exemplary embodiment of the haptic operator control device 100, such as may particularly advantageously be used in various equipment components 200, will now be described with reference to FIGS. 6 to 12. Use on a thumb roller 102 is for example possible.

Here, the support element 50 is configured such that sufficient space is available to enable the rotor unit 23 to be equipped with an encircling ring or the like.

Figure 6:
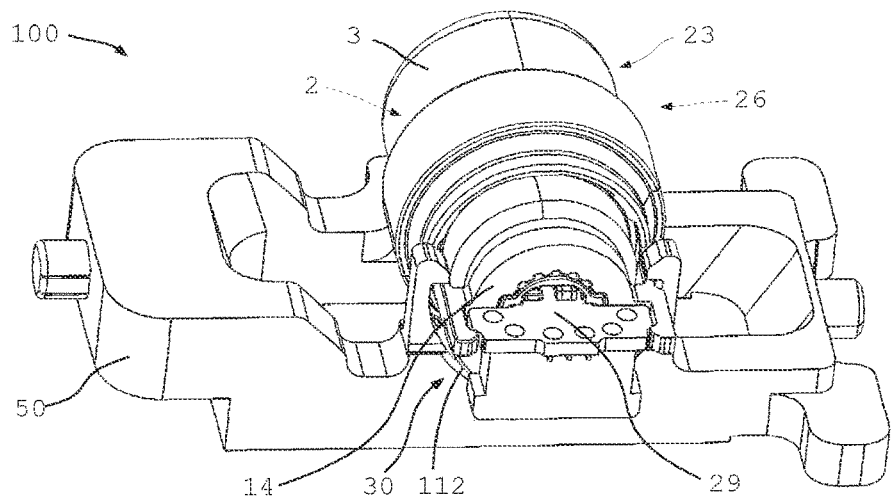
FIGS. 6-12 are schematic overall and detail illustrations of a further haptic operator control device for vehicles.

FIG. 6 is a perspective illustration of the haptic operator control device 100 for vehicles. Here, the stator unit 22 is substantially not visible as it is concealed by other components. Of the brake device 1, only an electronics unit (PCB and plug) 29 is visible here. The shank holder 14 is in this case fastened or clipped to the support element 50. Of the bearing device 30, only the bearing unit 112 is visible in the illustration shown here. The further bearing unit 118 is not visible here, as it is arranged behind the rotor unit 23.

Figure 7:
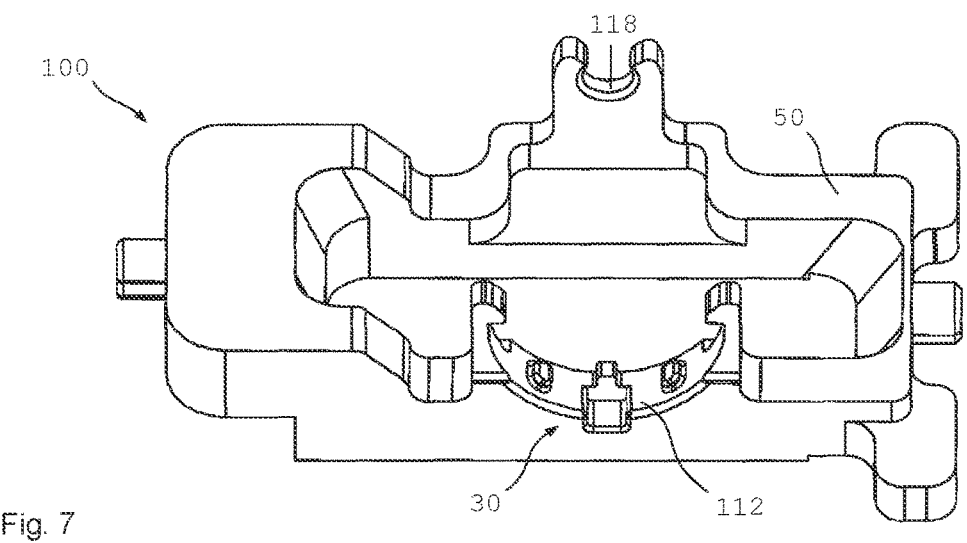

FIG. 7 shows the support element 50 of the operator control device 100 of FIG. 6. The support element 50 is in this case formed as a single-piece molded part composed of plastic, for example. The bearing units 112, 118, or the receiving regions thereof, can be clearly seen here. It is for example possible for one or more plain bearings or rolling bearings to be arranged on such receiving regions. The respective bearing unit 112, 118 may also be provided, in part, by the receiving regions themselves.

Figure 8:
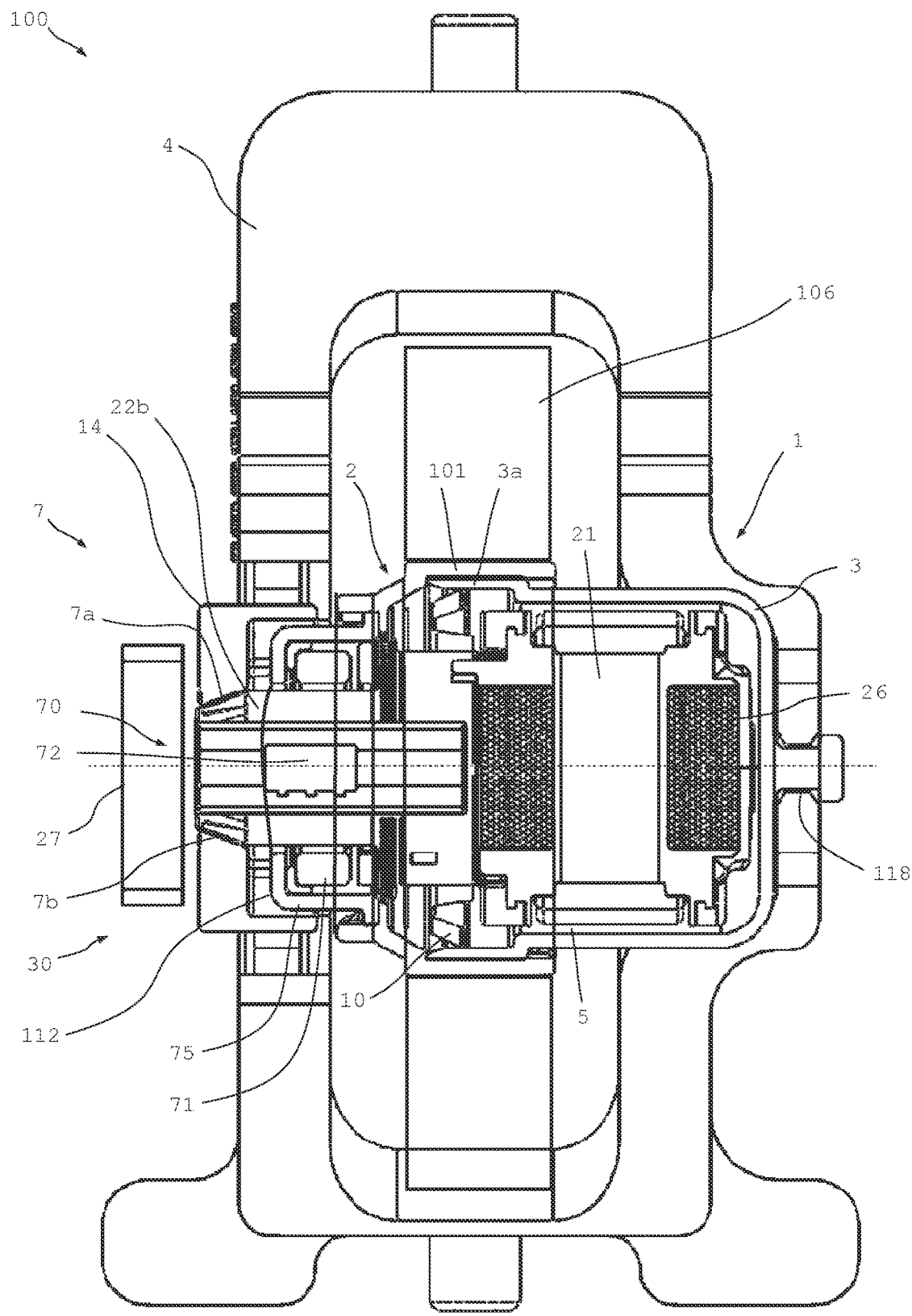

FIG. 8 shows a partially sectional plan view of the haptic operator control device 100 for a vehicle as per FIG. 6. To provide the operator control part 101, the rotor unit 23 is in this case equipped with a coarsely depicted encircling ring. In the region illustrated in section, it is possible here to clearly see the conical alignment portion 7 of the stator shank 22b and the associated alignment part 7b in the shank holder 14.

The seal 10 for sealing the brake chamber 110 has an approximately V-shaped cross section and bears by way of one limb of the "V", specifically the seal base 10a, against the stator element. The other limb bears radially at the outside against the inner circumference of the magnetically conductive brake element 3b of the outer brake component 3 and seals off the brake chamber 110 to the outside by way of the seal lip 10b. In this way, a very compact brake chamber and brake device 1 can be provided. The brake device 1 requires only an extremely small structural volume. The required quantity of magnetorheological medium is also particularly small, which reduces costs.

The magnetic field of the magnetic field source 26, which is generated substantially by the electrical coil 26a and which passes through the radially encircling gap 5 between the inner brake component 2 and the outer brake component 3, is closed via the magnetorheological brake element 3a.

A considerable advantage of the internal design illustrated is that the sensor device 70 is arranged at a great distance in an axial and a radial direction from the electrical coil 26a and the other components of the magnetic circuit, and in particular also from the outer brake element 3a of the outer brake component 3. In this way, the intensity of alternating stray fields in the region of the sensor device 70 is considerably reduced. The sensor device 70 comprises a magnetic field sensor 72 and detects an angle of rotation of the rotor unit 23 relative to the stator unit 22. Through the reduction of local magnetic stray fields, the accuracy of the angle determination can be considerably improved.

If the magnetically conductive outer brake element 3a of the outer brake component 3 is guided axially further in the direction of the sensor device 70, the magnetic fields which arise therein and which alternate rapidly and repeatedly during operation have an adverse effect on accuracy. This design very considerably increases accuracy in a simple manner.

A further and considerable improvement in measurement accuracy is achieved by means of the shield device 75 and the decoupling device 78. Here, the shield device 75 extends in encircling fashion, and in approximately C-shaped or U-shaped form in cross section, around the magnet ring unit 71, which in this case has a south pole and a north pole at radially opposite points. The alignment of the magnetic field at the stator shank 22b is measured. The smaller the influences of external magnetic fields or of the magnetic field of the magnetic field source 26 are there, the more accurate a measurement is possible, and the more accurately the brake device 1 can thus also be controlled.

In a simple case, the shield device 75 has multiple shield elements 76 and separating units 77, which collectively form the shield device 75. In one specific example, two lateral disk rings and one cylindrical sleeve form three shield elements which are adapted to one another and which bear sealingly against one another and ensure reliable shielding to the outside. The magnet ring unit 71 is received in the interior of the encircling profile, and is held spaced apart from the magnetically conductive shield elements 76 by means of one or more separating units 77. In this way, external magnetic fields are substantially kept away from the magnet ring unit 71 and the magnetic field sensor 72.

The nature and arrangement of the seal 10, which, by way of the seal lip 10b, bears at the outside against the inner circumference of the rotor element 23b or against the outer brake element 3a, also contribute considerably to improving measurement accuracy and to the simplicity of the design.

Figure 9:
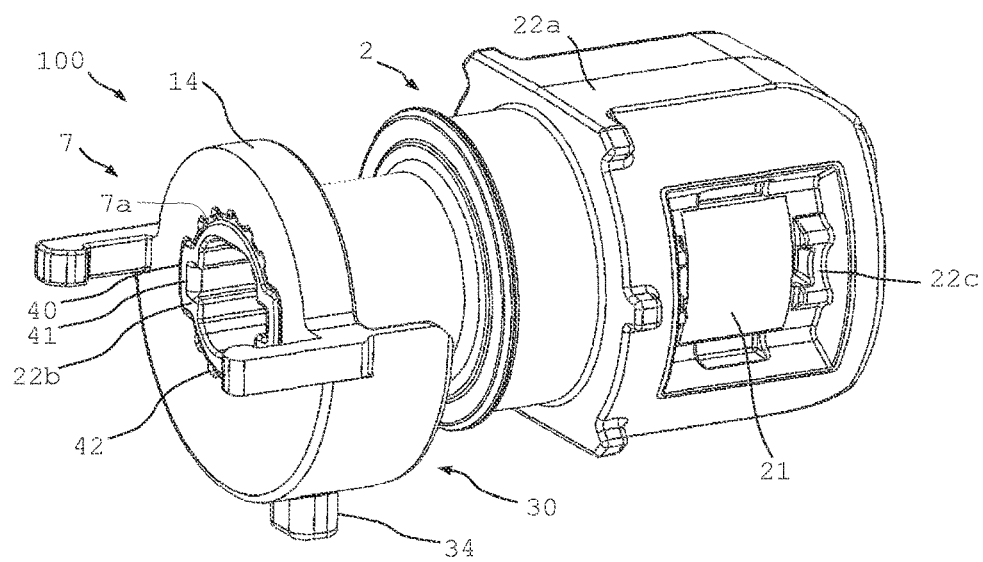

FIG. 9 illustrates the stator unit 22 together with the shank holder 14. For the sake of better clarity, the rotor unit 23 is not illustrated here. The core 21 can be seen. Adjacent to this, it is possible to see a receptacle or molded element 22c for guiding the transmission components or rotary elements 11, which are formed laterally adjacent to the core.

Figure 10:
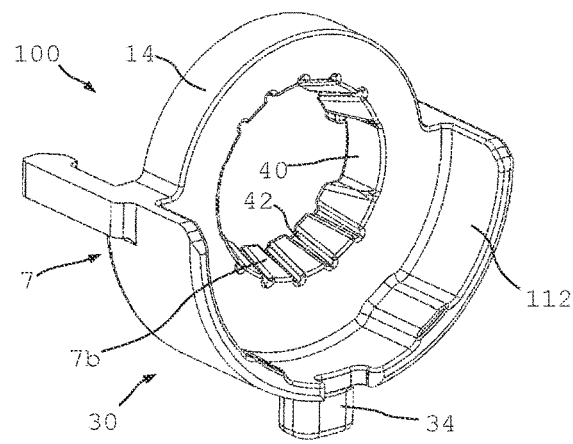

FIG. 10 illustrates the shank holder 14 on its own. Here, the alignment device 7 with the alignment portion 7a of the stator shank 22b and the alignment part 7b in the shank holder 14 can be clearly seen. It is also possible here to clearly see the receiving region, situated radially at the inside, of the shank holder for the bearing point 112. There may for example be one or two or more bearing points of the bearing unit 112 there.

Here, the shank holder 14 is equipped with a peg 34 for allowing rotationally conjoint attachment to the support element 50 (the reaction moment is dissipated via said peg). The shank holder 14 in this case furthermore has two grooves 40 in the receiving region for the stator shank 22b. The grooves 40 serve for rotationally fixedly receiving the stator shank 22b. For this purpose, the stator shank 22b has two corresponding elevations 41, which engage with the grooves 40. Furthermore, the shank holder 14 in this case has adhesive grooves 42 for receiving and/or distributing an adhesive. The stator shank 22b is adhesively bonded to the shank holder 14 by means of the adhesive.

Figure 11:
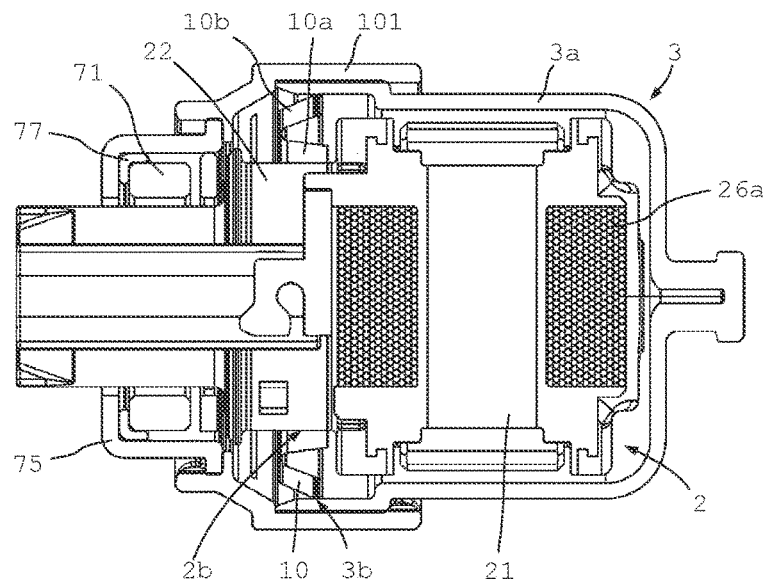

FIG. 11 shows a section through a haptic operator control device 100 for vehicles, wherein the inner brake component 2 and the outer brake component 3, the seal 10, the operator control part 101 and the electrical coil 26a are visible. The shank holder 14 can also be seen.

Figure 12:
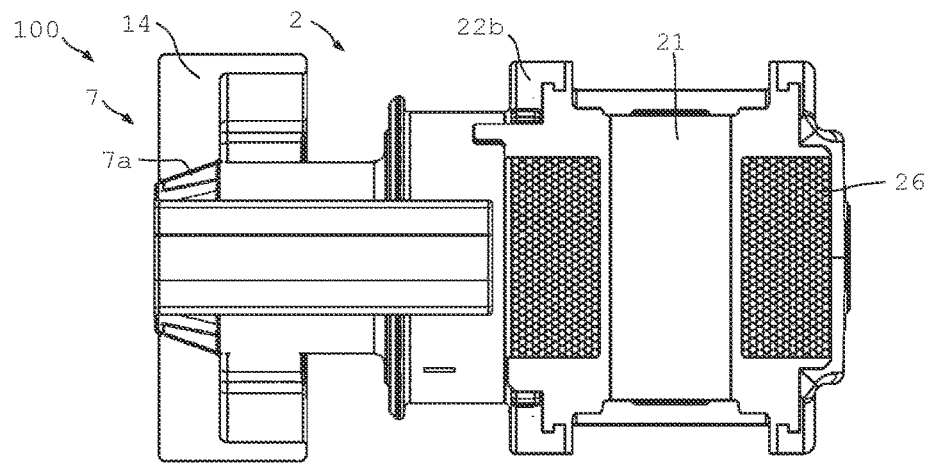

FIG. 12 shows a view of the stator unit 22 and of the shank holder 14, wherein the rotor unit 23 is not visible.

FIGS. 13a to 13d illustrate different haptics modes during the operator control of the haptic operator control device for vehicles.

Figure 13A:
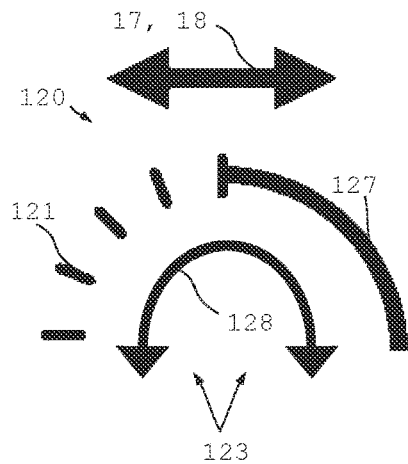
FIGS. 13a-e are purely schematic illustrations of the mobility of the operator control part by means of the magnetorheological brake device during actuation of the operator control part.

FIG. 13a shows, purely schematically, an illustration of a graduation of the movement range during the rotation of the operator control part 101, wherein the mobility is influenced by the magnetorheological brake device, and a direction-dependent idle travel is provided.

The haptic operator control device 100 for vehicles is in this case designed as, or comprises, a thumb roller or operator control wheel. A haptics mode in this case describes a possible embodiment of a method for controlling the operator control part 101.

In the haptics mode illustrated here, the operator control part 101 functions in a direction-dependent manner in accordance with the movement 809 in the movement range 812. If the operator control part 101 is rotated to the left, the brake device 1 generates a rotational-angle-dependent graduation 810 with stop points 811 that the user perceives as a resistance that can be overcome during a rotation. If the operator control part 101 is moved to the right, there is an idle travel 829 in which the operator control part 101 is freely rotatable. It is thus made possible here for the user to be provided with direct feedback relating to their input. The haptics mode is also referred to as pushing and blocking 816.

Figure 13B:
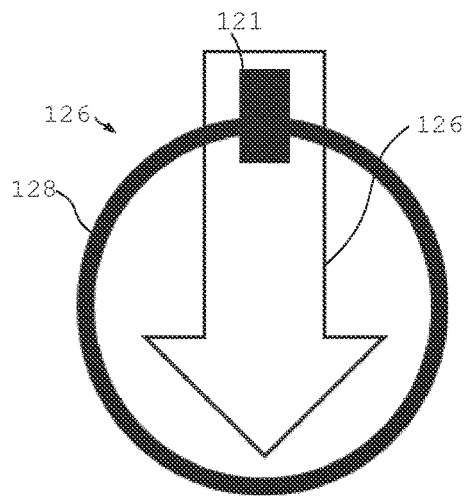

A further haptics mode of the method is illustrated in FIG. 13b. After a linear movement of the operator control part 101, the mobility of the operator control part 101 is completely blocked by means of the magnetorheological brake device 1. An undesired parallel erroneous input by the user is thus prevented in an effective manner. The force at the stop point 121 is so high that a user cannot practically overcome it.

Figure 13C:
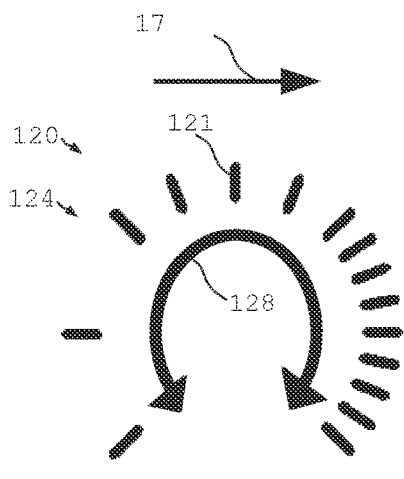

A further haptics mode is illustrated in FIG. 13c. The graduation 120 in the movement range 128 is in this case varied in a speed-dependent manner 124 or acceleration-dependent manner 124. In the case of a fast rotational movement of the operator control part 101 by the user, a spacing between two mutually adjacent graduation points 121 varies in a speed-dependent manner. In the case of the illustrated movement 17, the spacing of the stop points 121 that the user perceives during a rotation decreases with increasing speed.

Figure 13D:
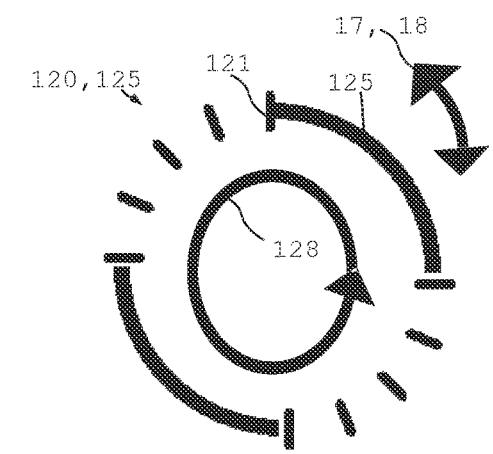

FIG. 13d illustrates a further embodiment of the method. Here, the operator control part 101 is freely rotatable, resulting in an endless movement range 128. In the present case, individual stop points 121 of the graduation 120 are skipped (graduation points 125) in the presence of a high acceleration of the operator control part 101. A speed-dependent graduation is provided within the movement range of the operator control part by means of the magnetorheological brake device.

The movement range 128 of an operator control part 101 may be variable and in particular settable in a manner dependent on the haptics mode. An adaptation of the mobility and of haptic feedback to the individual requirements of a user, or in a manner dependent on a use or a program, is advantageously thus possible.

Figure 13E:
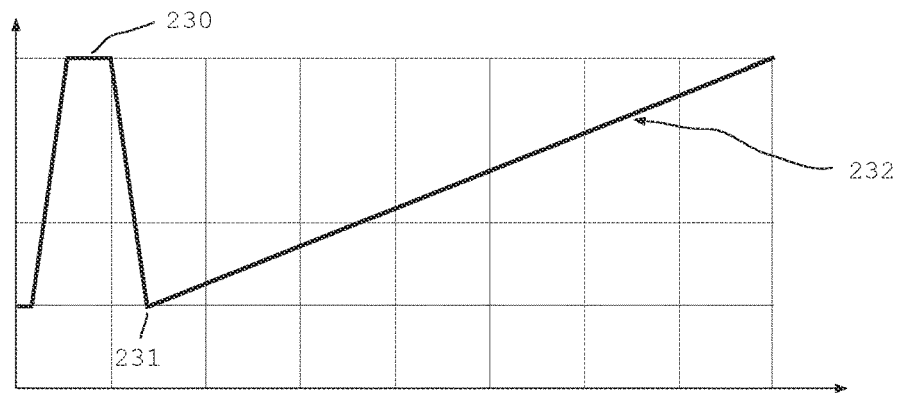

FIG. 13e shows the possible use when starting a program or during the operator control of an item of equipment such as a radio. The operator control part 101 can initially be rotated for example to a minimal degree—or in other cases practically not at all—with a low resistance. The required torque subsequently increases steeply or even abruptly up to the threshold 230. After the threshold 230 is overcome, it is for example the case that an appliance is started or switched on. The rotational resistance decreases to a relative minimal moment 231. The function of the operator control part 101 is in this case changed immediately thereafter. For example, in the case of continued rotation, the volume is varied. Here, the required torque is increased linearly in accordance with the gradient 232. It is also possible for the profile to be non-linear. It is also possible that, proceeding from a certain setting (volume, sensitivity, brightness of an illumination), a steeper gradient is set, or the required moment is abruptly increased by a certain amount. It is thus for example also possible for a vehicle to be started using a haptic operator control device (for example with a thumb wheel/roller in the steering wheel). When the operator control part 101 (for example a wheel or rotary dial) is rotated, a threshold is generated. After the threshold is overcome, a function is started, for example similarly to the case when an ignition key is rotated, in the classic manner, to the first position. The rotational resistance thereafter falls to a lower or minimal moment. Continued rotation causes a switch to the activated mode, or to preheating in the case of diesel engines. Here, the resistance increases constantly. Further rotation starts the engine, as in the case of the classic ignition key.

This function may be adapted to any desired usage situations, for example also when picking up a telephone in the vehicle. The user firstly accepts the call by having to rotate the rotary dial over a torque threshold. The torque thereafter assumes a lower value again, and the user can increase the volume by way of an onward rotation, or can reduce the volume by way of an opposite rotation. When ending the telephone call, the same occurs in the opposite direction. The same applies to the radio: to switch on, the thumb wheel is rotated over a threshold, the volume is thereafter increased, and the resistance increases with volume.

The preferably low-alloyed steel can maintain a residual magnetic field. The steel is preferably demagnetized at regular intervals or when required (inter alia by means of a special alternating field).

It is preferable for the material FeSi3P (silicon steel) or materials of similar nature to be used for the components through which the magnetic field flows.

In all cases, speech or noise control is possible. The brake device can be adaptively controlled using speech control.

The control may additionally be assisted using artificial intelligence (deep learning/machine learning) in order to additionally adapt the haptic functions to the user and improve said haptic functions.

When the rotary unit is not being rotated, that is to say when the angle is constant, the electrical current is preferably decreased continuously over time. The electrical current may also be varied in a speed-dependent manner (rotational angular velocity of the rotary unit).

LIST OF REFERENCE DESIGNATIONS

1 Magnetorheological brake device
2 Brake component
2b Contact portion
3 Brake component
3a Brake element
3b Contact region
5 Gap, channel, brake gap
5a Gap width
6 Medium
7 Alignment device
7a Alignment portion
7b Alignment part
8 Field, magnetic field
9 Free spacing
10 Seal
10a Seal base
10b Seal lip
11 Transmission component, rolling element, rotary element
12 Axis of rotation
14 Shank holder
14a Portion
14b Portion
15 Cylinder, ball
16 Wedge shape
16a Acute-angled region
17 Direction of the relative movement
18 Direction of the relative movement
19 Magnetic particles
20 Axial direction
21 Core
21b Minimum diameter
22 Stator unit
22a Stator element
22b Stator shank, shank
22c Molded element
23 Rotor unit, rotary dial
23a Sleeve
23b Rotor element
23c Height
23d Wall thickness
25 Radial direction
26 Magnetic field source
26a Coil
26b Maximum diameter
26c Coil plane
26d Radial direction with respect to 26c
27 Control device
28 Potting compound
29 Electronics unit
30 Bearing device
32 Transverse groove
34 Peg
35 Cable leadthrough
37 Projection
39 Volume compensation
40 Groove
41 Elevation
42 Adhesive groove
43 User interface
44 Travel limiting means
45 Cable
49 Lining
50 Supporting element, console
61 Angle segment
62 Angle segment
63 Receptacle for 11
64 Outer surface
65 Radial gap dimension
66 Radial spacing
67 Inner surface of 23b
70 Sensor device
71 Magnet ring unit
72 Magnetic field sensor
73 Sensor line
75 Shield device
76 Shield element
77 Separating unit
78 Decoupling device
100 Haptic operator control device
101 Operator control head, operator control part
102 Thumb roller
110 Brake chamber, closed chamber
112 Bearing unit, first bearing point
114 Volume of 110
118 Bearing unit, second bearing point
119 Axle stub
120 Graduation
121 Stop point
122 Radial direction (global)
123 Direction dependency
124 Speed-dependent, acceleration-dependent
125 Skipping
126 Pushing and blocking
127 Idle travel, freely rotatable
128 Movement range
200 Equipment component

The invention claimed is:

1. A haptic operator control device for vehicles, the device comprising:
a rotatable operator control part;
at least one magnetic field source;
at least one magnetorheological brake device configured for braking a rotational movement of the operator control part;
said magnetorheological brake device having:
a first brake component and a second brake component, said first and second brake component being rotatable relative to one another and at least one of said first and second brake component being coupled to the rotatable operator control part;
said first brake component being an inner brake component, and said second brake component, being an outer brake component, surrounding said first brake component at least in portions;
a magnetorheological brake chamber between said first and second brake components, and said magnetorheological brake chamber having a magnetorheological medium and at least one gap;

the outer brake component having an outer brake element which has a cylindrical inner surface at least in portions; and on at least one angle segment of the outer circumference of a core of said magnetic field source, at least one transmission component being disposed between said core and said cylindrical inner surface of the outer brake element; and on said angle segment, said core, and/or molded elements laterally adjacent to the core on the first brake component, having at least one receptacle configured to the shape of the transmission components.

2. The device according to claim 1, wherein an outer surface of the core is cylindrical over the angle segment.

3. The device according to claim 1, wherein:
the outer brake component is rotatable and the operator control part is coupled to the outer brake component, or
the inner brake component is rotatable and the operator control part is coupled to the inner brake component.

4. The device according to claim 1, wherein the inner brake component extends in an axial direction, and the inner brake component is configured as a stator unit and the outer brake component is configured as a rotor unit.

5. The device according to claim 4, wherein the stator unit has a stator element with a core composed of a magnetically conductive material and with an electrical coil wound around the core as a magnetic field source.

6. The device according to claim 5, wherein the electrical coil is wound in an axial direction about the core and spans a coil plane, such that a magnetic field of the electrical coil extends transversely through the inner brake component.

7. The device according to claim 6, wherein a maximum outer diameter of the electrical coil in a radial direction within the coil plane is greater than a minimum outer diameter of the core in a radial direction transverse with respect to the coil plane.

8. The device according to claim 5, wherein the electrical coil is received on the core outside the angle segment and extends radially further to the outside than the outer surface of the core in the angle segment.

9. The device according to claim 1, further comprising:
at least one transmission component being disposed in the brake gap; and
wherein at least a proportion of the at least one transmission component is composed of a magnetically conductive material, and said at least one transmission component is configured as a rolling element and has a cross section selected from the group consisting of a cylindrical, spherical, round, and rounded.

10. The device according to claim 1, wherein:
said at least one angle segment is configured as at least two angle segments,
said transmission components are disposed on said at least two angle segments,
at least one of said at least two angle segment is less than 150°; and
said transmission components are disposed only in said angle segments.

11. The device according to claim 1, further comprising:
a radial gap dimension between the transmission components and the cylindrical inner surface of the outer brake element; and
said radial gap dimension being smaller than a radial spacing between the coil and the cylindrical inner surface of the outer brake element.

12. The device according to claim 1, wherein the operator control part is formed on the outer brake component and is configured as a rotary part, rotary dial, or rotary wheel.

13. The device according to claim 1, further comprising at least one user interface, one operator control panel, one display, one touch-sensitive display with or without haptic feedback.

14. The device according to claim 1, further comprising at least one component through which the magnetic field flows, said at least one component being composed at least partially of the material FeSi3P, and/or magnetic field strengths of greater than 350 A/m are generated in the gap.

15. The device according to claim 1, further comprising a shank of the inner brake component, said shank being disposed on a support element by at least one shank holder.

16. The device according to claim 1, wherein the outer brake component is mounted in axially displaceable fashion on a support element.

17. The device according to claim 1, further comprising a control device that is configured to brake the rotational movement of the operator control part by the brake device dependent on an operating state of a motor vehicle, said operating state has at least one driving operating mode and at least one standstill operating mode.

18. A haptic operator control device for vehicles, the device comprising:
a rotatable operator control part;
at least one magnetic field source;
at least one magnetorheological brake device configured for braking a rotational movement of the operator control part;
said magnetorheological brake device having:
a first brake component and a second brake component, said first and second brake component being rotatable relative to one another and at least one of said first and second brake component being coupled to the rotatable operator control part;
said first brake component being an inner brake component, and said second brake component, being an outer brake component, surrounding said first brake component at least in portions;
a magnetorheological brake chamber between said first and second brake components, and said magnetorheological brake chamber having a magnetorheological medium and at least one gap;
an outer brake element of said outer brake component composed of a magnetically conductive material and providing an outer ring for the magnetic field; and
at least a radial wall thickness of the outer brake element being at least half as great as a gap width of the gap and/or a diameter of a transmission component.

19. A haptic operator control device for vehicles, the device comprising:
a rotatable operator control part;
at least one magnetic field source;
at least one magnetorheological brake device configured for braking a rotational movement of the operator control part;
said magnetorheological brake device having:
a first brake component and a second brake component, said first and second brake component being rotatable relative to one another and at least one of said first and second brake component being coupled to the rotatable operator control part;
said first brake component being an inner brake component, and said second brake component, being an outer brake component, surrounding said first brake component at least in portions;
a magnetorheological brake chamber between said first and second brake components, and said magnetorheological brake chamber having a magnetorheological medium and at least one gap;
a shank of the inner brake component, said shank being disposed on a support element by at least one shank holder
said inner brake component being configured as a stator unit, said stator unit being disposed rotationally fixedly on the shank holder, the shank holder is disposed axially displaceably on the support element, and the shank holder radially surrounding the outer brake component at least in portions.

20. The device according to claim 19, wherein the inner brake component is fastened only at one side to the support element, and/or is fastened only by way of one end portion of the shank to the support element.

\* \* \* \* \*